United States Patent [19]

Widmayer et al.

[11] Patent Number: 4,933,798
[45] Date of Patent: Jun. 12, 1990

[54] SELF PROTECTING AND AUTOMATIC RESETTING CAPACITOR SYNCHRONOUS SWITCH APPARATUS FOR CONTROL OF AC POWER TO INDUCTIVE LOADS

[75] Inventors: Don F. Widmayer, Bethesda; Weitzu Chiu, Rockville, both of Md.

[73] Assignee: Widmayer R&D Ventures, Bethesda, Md.

[21] Appl. No.: 338,366

[22] Filed: Apr. 13, 1989

Related U.S. Application Data

[63] Continuation of Ser. No. 112,040, Oct. 22, 1987, abandoned, which is a continuation of Ser. No. 944,866, Dec. 22, 1986, abandoned.

[51] Int. Cl.⁵ .............................................. H02H 7/00
[52] U.S. Cl. .................................... 361/18; 323/223; 323/239; 315/248; 315/291; 363/127
[58] Field of Search ............... 323/220, 223, 225, 235, 323/239; 315/248, 291; 361/18; 363/126, 127

[56] References Cited

U.S. PATENT DOCUMENTS

| | | | |
|---|---|---|---|
| 3,835,401 | 9/1974 | Tomita et al. | 323/225 |
| 4,016,481 | 4/1977 | Bradley | 323/225 |
| 4,350,935 | 9/1982 | Spira et al. | 318/294 |
| 4,542,451 | 9/1985 | Hucker | 323/225 |
| 4,636,619 | 1/1987 | Sugimori | 323/235 |

Primary Examiner—M. H. Paschall
Assistant Examiner—Jeffrey A. Gaffin
Attorney, Agent, or Firm—Larson and Taylor

[57] ABSTRACT

A power controller is provided for controlling the average power provided from an AC voltage source power supply to an AC electrical load. Three shunt connected elements, comprising two electronic switches and a capacitor with rectifying diodes, are connected between the AC source and the load. A control circuit controls switching of the switches in timed relationship to the state of the voltage on the shunt capacitors so as to control the average power supply to the load. The control circuit switches one of the electrical switches to the conductive state thereof near the zero crossover of the AC wave of the source voltage and subsequently switches the second switch to the conducting state thereof at a variable time during each half wave in a manner that causes the first switch to return to the non-conducting state thereof. The second switch returns to the non-conducting state thereof at a later time prior to the end of the AC half wave so that the load current is not discontinuous except at the zero crossover points.

15 Claims, 7 Drawing Sheets

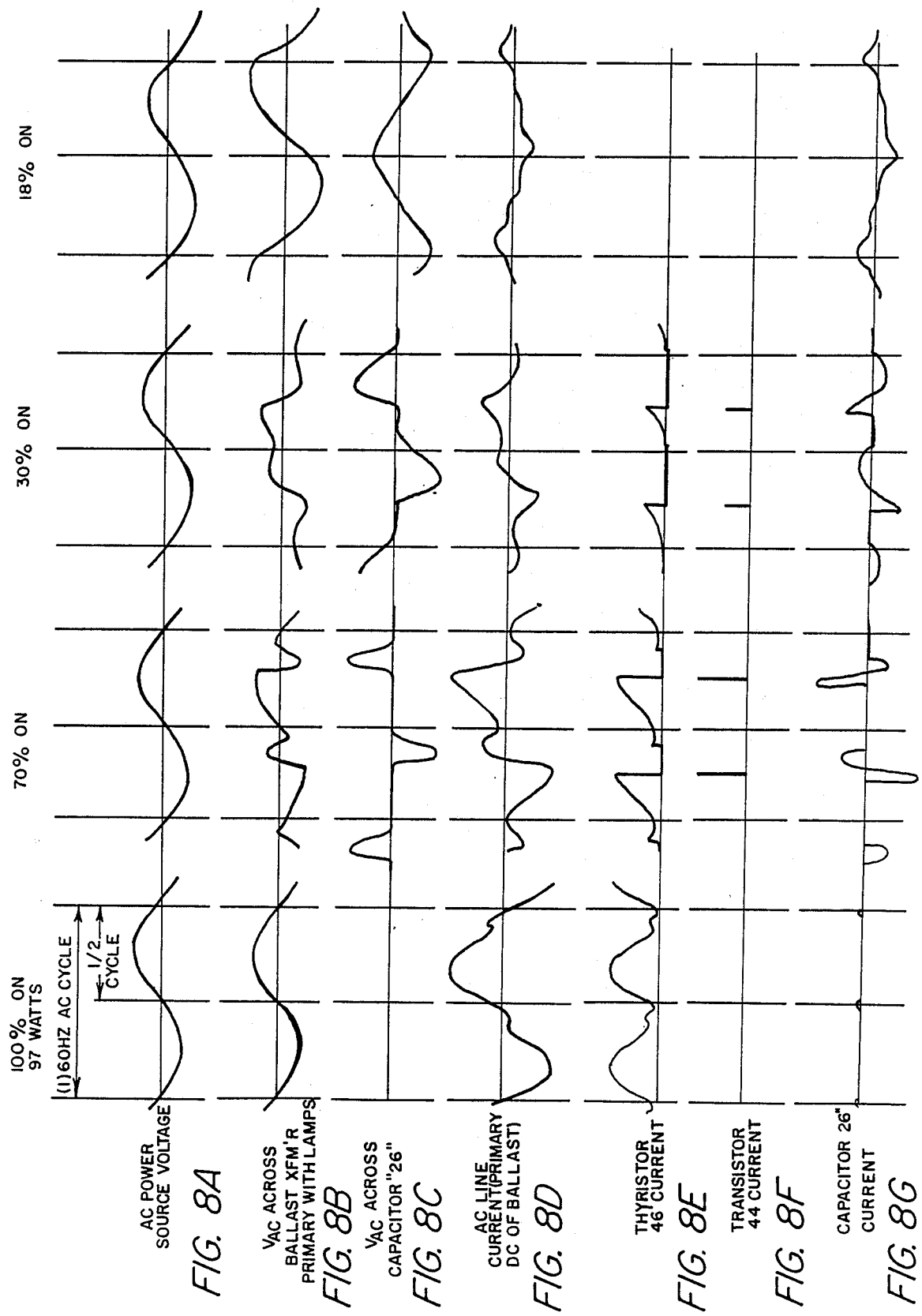

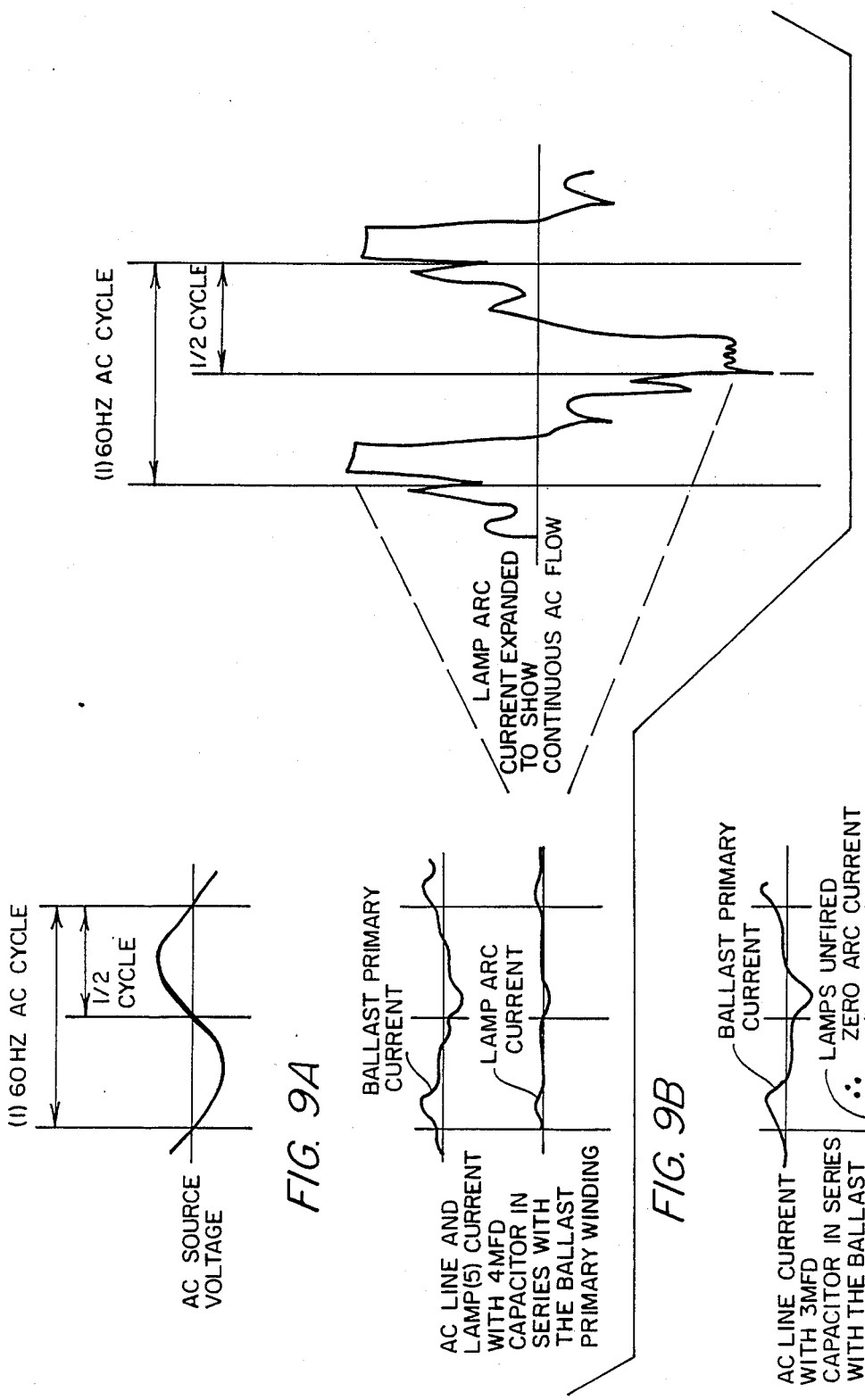

SELF PROTECTING AND AUTOMATIC RESETTING CAPACITOR SYNCHRONOUS SWITCH APPARATUS FOR CONTROL OF AC POWER TO INDUCTIVE LOADS

This application is a continuation of application Ser. No. 07/112,040 filed Oct. 22, 1987, now abandoned, which is a continuation of Ser. No. 06/944,866 filed Dec. 22, 1986, now abandoned.

FIELD OF INVENTION

The field of invention is that of the control of AC power to AC loads by the use of synchronous switching devices. This invention is for the improved implementation of the synchronous switch function required for controlling the average power from an AC voltage source power supply to an AC load, particularly loads having significant inductive properties, such as a ballast transformer(s) used in the operation of rapid start fluorescent lamp gas discharge devices.

BACKGROUND OF THE INVENTION

Many techniques are available for controlling the average power from an AC voltage source power supply to an electrical load. One of the most efficient methods is the use of a series deployed synchronously operated two-state (on-off; or, open-closed; or, conducting-non conducting) switching device wherein the average voltage per AC half wave cycle applied to the load, and thus the average real power, is varied by controlling the relative timing at which the switch changes from one of its two states, to the other. These techniques are loosely termed "AC Phase Control" when really they are a form of Pulse Time Modulation (PTM) where the carrier is an impulse wave train marking the zero crossings, positive going and negative going of the sinusoidal voltage wave. The parameter being modulated is usually the duration (sometimes termed width) of one or the other of the two states of the switching device relative to the above impulse wave train to define the Pulse Duration Modulation (PDM) variant of PTM. Then two distinct forms of PDM ("AC Phase Control") are definable. The first can be described as when the conducting or "on" state of the switch follows a timed non-conducting or "off", state of the switch which starts at a time index marked by the impulse wave train. This control methodology is termed Normal or Direct Phase Control and is particularly well suited to regenerative switching devices of the semiconductor world, classed as Thyristor structures (PNPN) which generally cannot be returned to their non-conducting state with a signal at the control port (the "gate electrode") but recover naturally to their non-conducting state each time the controlled current approaches zero. Hence, turn-off occurs near or at the end of every half cycle of conducted current. The second form of AC Phase Control is called Inverse or Reverse AC Phase Control because it has the opposite relationship of conducting and non-conducting periods of the synchronous switch. Consequently this class of control cannot use switching devices of the Thyristor class as they normally, i.e., "easily", cannot be turned off through action on a control port (the "gate" electrode). Therefore, this form of AC Phase Control requires the use of non-regenerative switching devices of the transistor class, either of bipolar and unipolar (FET) junction structures.

A further generalization within the above particular form of PDM construct to a more general form of PDM is to vary the instant of transition between the conducting and non-conducting states of the synchronous switch, nominally identified as turn-on and turn-off with their obvious connections to the states, such that both, not just one, do not necessarily coincide with an AC voltage wave zero crossing.

Thus there are four basic turn-on/turn-off combinations within the PDM control discipline. For purposes of exposition, in the ensuing discussion gamma ($\gamma$) will correspond to "turn-on" and delta ($\delta$) will correspond to "turn-off". Note that gamma and delta may be interchanged in the course of an AC half wave and further, may be repeated during the half wave period. Furthermore, and as noted above, the two special cases of Normal and Reverse AC Phase Control correspond to one of the instants occurring at the zero crossing.

| CASES: $\delta$ = turn-off, $\gamma$ = turn-on | CHARACTERIZING NOMENCLATURE |
|---|---|
| 1. $\gamma$ before $\delta$ and both variable | ON-OFF "NOTCH" |
| 2. $\delta$ before $\gamma$ and both variable | OFF-ON "NOTCH" |
| 3. $\delta$ = carrier wave zero cross and $\gamma$ is variable | NORMAL PHASE CONTROL |
| 4. $\gamma$ = carrier wave zero cross and $\delta$ is variable | REVERSE PHASE CONTROL |

The preferred combination of turn-on and turn-off for a given application depends critically upon the desired circuit action and the type of device(s) selected to implement the series disposed synchronous switch. In summary, the above two generic cases, 1. and 2., and the two special cases, 3. and 4., may be usefully termed generalized AC Phase Control with full understanding and recognition that their properties derive from those of Pulse Duration Modulation form of PTM well known from the fundamental theory of Electrical Communication pertaining to Modulation.

In circuit operation involving switching, two basic rules may be surmised, that are readily derivable from the underlying physics of lumped constant electric circuits. The first is: avoid opening a switch in series with an inductor, a true energy storing inductor, while current is flowing. To the extent the switch opening causes $di/dt$ to approach infinity, i.e., the current instantaneously going to zero, a voltage approaching infinity will appear across both the switch as well as the inductor. The second is: avoid closing a switch in shunt with a capacitor which has a stored charge, manifested by a voltage between its terminals. To the extent that the switch closing causes $dv/dt$ to approach infinity, i.e., the voltage instantaneously going to zero, the current flow through the switch approaches infinity. Furthermore, either the stored magnetic, (for an L) or the stored electric energy, (for a C) must perforce be dissipated in the switch. The significance of these two "rules" are explained in more detail in co-pending U.S. patent application Ser. No. 571,830, filed Jan. 19, 1984 and Ser. No. 723,184 filed on Apr. 15, 1985 and now U.S. Pat. No. 4,642,525 issued Feb. 10, 1987 and all the references cited therein and at least recognized degree in U.S. Pat. No. 4,350,935 (Spira et al) and the references cited therein as well as Widmayer U.S. Pat. Nos. 4,352,045 and 4,394,603.

AC power circuits using switching are often implemented with semiconductor devices rated as capable of meeting the steady state operating voltage and current requirements of the application plus some safety margin ultimately limited by economic considerations. However, there are times when current and/or voltage transients, many times the steady state level, are present and, on occasion, they may exceed the economical safety margins provided by a given design. These electrical transients in AC phase control circuits, particularly the generalized ones heretofore discussed, are caused by the generation of unipolar currents, i.e., "DC", transients due to non-synchronous (asynchronous) switching or excessive asymmetric current flow resulting from events relating either to the source of power or the control mechanisms herein considered, or in the electrical load, or, any or all of the combinations thereof. The presence of transients must be anticipated and the circuit must be designed so that the safe operating ratings of its components are not exceeded when the circuit is operating with current or voltage transients that are substantially in excess of the steady state operating levels.

Examples of non-synchronous switching, where current transients may be generated that are in excess of the ability of some semiconductor electronic devices to handle, or, which in turn cause voltage transients, include the turning on or off of the branch circuit by electromechanical switching device to connect a load and its power controller, if any, to the AC voltage source. In this instance unless the branch circuit switching device were to be turned-on exactly at a specified phase angle (related to that of the prior turn-off), it is likely, that a high transformer magnetizing in-rush current transient will occur. This transient problem was identified long ago as due to remnant polarization (i.e., core magnetization) and was cited as a transient inducing problem beginning in Column 14 line 9 of U.S. Pat. No. 4,350,935. Likewise, circuit design considerations and consequent device characteristics often unexpectedly cause circuit consequences such as the large phase reversal current transient which may occur during the first AC cycle in circuits that have a capacitor and a saturable non-linear magnetic core device in series relationship with the potential for unwanted ferroresonance effects to occur. This phase reversal phenomena is explained in further detail in U.S. application Ser. No. 723,184 (filed Apr. 15, 1985) and now U.S. Pat. No. 4,642,525. In addition, a large current transient flowing in a series capacitor/non-linear inductor circuit can develop voltage across the series capacitor which can exceed the ratings of it and any other related circuit components. Still further, and as more fully explained in co-pending application Ser. No. 571,830, filed Jan. 19, 1984, a switch closing around a capacitor with significant stored energy can result in a damaging current transient upon closing of the switch. In addition, the phenomena called ferroresonance, which can create large voltages and ensuing current transients, can cause circuit damage unless protective steps are taken. Further information on this phenomena may be found in co-pending U.S. patent application No. 769,829 filed on Aug. 29, 1985 and now U.S. Pat. No. 4,766,352, issued on Aug. 23, 1988. Non-synchronous switching will also occur during the start-up or shut-down periods of the Power Controller's control signal generation function if proper inhibiting is not included.

A further problem stems from the widespread use of a bipolar transistor as a unidirectional current switching device connected between the DC terminals of a rectifying diode bridge to implement the bi-directional synchronous switch function, particularly in the previously discussed "reverse" or "on"-before-"off" AC phase control circuits. Such a bipolar transistors, used as a unidirectional current switch, needs a base signal capable of driving and maintaining the collector-emitter in saturation in order to minimize power dissipation. However, it is not practical to provide a base drive of sufficient amplitude to keep the transistor in saturation for those occasions where a large current transient has to flow through the collector-emitter (C-E) circuit. Moreover, a large collector current of sufficient duration can result in the opening of the electrode bonding wire element ($I^2t$ rating) or if large enough to take the transistor out of saturation, can cause melting of the junction structure due to the high instantaneous power being dissipated (exceedance of the safe operating area (SOA) rating).

Nevertheless the bipolar transistor is used in Reverse Phase Control applications because it can be readily turned-off by appropriate electrical drive applied to its base electrode.

Of note, Reverse AC Phase Control circuit operation is characterized by an increasingly leading power factor as the average power flow to the electrical load is reduced, whereas Normal AC Phase Control circuit operation is characterized by an increasingly lagging power distortion factor as the average power flow to the electrical load is reduced. Reverse AC Phase Control circuit operation has been found useful in applications where it is desirable for the control action on the reduced electrical load to provide a leading rather than lagging power factor. This leading characteristic tends to compensate for other lagging loads powered by the same electrical power system. In such Reverse AC Phase Control applications the electronic device implementing the synchronous switch is turned on at the zero crossover of the AC source and turned off at some variable point in time (or phase angle) before the next zero crossover. Since this turn-off control is possible when substantial current can be flowing, care must be taken to prevent destructive voltage transients from developing as a result of the closed circuit having stored magnetic energy properties. This protective function can be a by-product of utilizing a critically valued capacitor that is large enough to cause a beneficial amount of ferroresonance to increase the voltage appearing across the ballast primary winding to aid lamp ignition, to provide a minimum level of RMS voltage to the ballast primary after ignition, to provide an adequate level of lamp cathode heater voltage, where applicable, as well as providing a minimum level of arc current to provide a low level of stable lamp arc operation during periods of the half wave that the synchronous switch is not conducting. Thus the critical value capacitor element associated with the synchronous switch is multipurpose and lamps can be operated without the periods of current discontinuity within the AC half cycle that is normally associated with AC Phase control.

The capacitor must be of a critical value properly related to the parasitic inductive properties of the load circuit. In addition its capacitance value must be sufficiently large so that the voltage developed across the capacitor does not exceed is voltage ratings or the voltage rating(s) of the synchronous switch elements yet not large enough to unnecessarily reduce the control range of the Power Control technique being implemented. With some variation between ballasts models and manufacturers a value around 4 microfarads is useful for an AC load comprised of one 120 volt rapid start ballast and two F40 rapid start fluorescent lamps. This value of capacitance will among others, cause sufficient ferroresonance to occur to provide lamp ignition, continuous arc current during each half cycle to provide stable low level lamp operation, a post ignition regulated voltage on the ballast primary (despite fluctuations of the line voltage) at a level sufficient to provide an adequate heating of lamp cathodes where applicable.

However, the addition of such a critically valued capacitor also necessitates that turn-on of the transistor switch be variable in time to prevent turn-on whenever the capacitor has a substantial stored electric charge, (i.e., a voltage of significance across its terminals) as explained in detail in co-pending U.S. patent application No. 571,830 filed Jan. 19, 1984. Further it can cause damaging consequences to the power controller if the load circuit is energized without the lamp portion of the load. For example, one of the lamps can be removed (which simulates a failed lamp) when the circuit is energized and cause a non-symmetrical voltage buildup across the capacitor can be observed over a period of several AC ½ cycles before the buildup exceeds the voltage withstand ratings of the rectifying diode bridge elements or the switching transistor. Since it is also unpredictable as to when a circuit fault might be corrected, e.g., failed or removed lamp or lamps might not be replaced for hours or days, and during such period the ferroresonance effects of voltage magnification and resulting current transients could damage, if not destroy, the control elements if synchronous switching is attempted with the incomplete load circuit. However, the control circuit can be protected from any damaging effects of the ferroresonance by turning the synchronous switch full-on or full-off when such a load fault occurs. When the transistor conducts (the low level magnetizing current) throughout the AC cycle, ferroresonance effects cannot occur, since the capacitor, whose series relationship with the transformer ballast, and its inductive properties is the cause of the ferroresonance, is effectively shorted out of the circuit. Circuits have been demonstrated that turn the synchronous switch, i.e., the switching transistor, full-on when ferroresonance occurs, and generally, are returned to normal operation, by turning power off to unlatch the full-on circuit. Normal operation then occurs at the next power turn-on if the ferroresonance is damped by a proper load circuit being present. Circuits have also been demonstrated where the synchronous switch is turned full-off and while some beneficial ferroresonance is still present damaging current transients are not generated.

In summary, for high reliability of switching circuits employing a by-pass capacitor, operating within an AC half wave, where both control of "on" and "off" is a requirement, a bi-polar transistor, while having the ability to be turned both "on" or " off", has some remaining shortcomings with respect to its ability to be kept within its Safe Operating Area rating(s) whenever current transients are present. It is obvious that a gate controlled thyristor, insulated gate transistor, field effect transistors, or other hybrid semiconductor devices with higher current ratings are candidates for consideration in applications requiring both "ON"-before-"OFF" control. However, these alternative devices usually present other problems such as insufficient voltage withstand and/or high power dissipation associated with a generally higher voltage drop across the device, or high turn-off drive levels which adds further levels of complication and therefore generally makes them even less desirable than the bipolar transistor with its shortcomings.

SUMMARY OF INVENTION

This invention provides for an improved implementation of a synchronous switch type of power controller for the control of AC Power to an electrical load. The invention provides for a high effective $I^2t$ rating for the implemented synchronous switch function. It also provides starting as well as protective, automatic resetting and measurement features, which are particularly useful in applications wherein the electrical loads have inductive properties such as fluorescent lighting transformer-type ballasts.

The improved synchronous switch of the present invention consists of a reverse blocking thyristor shunting a bipolar silicon junction transistor connected across the DC terminals of a rectifying diode bridge circuit with a critically valued capacitor connected across the AC terminals of the bridge circuit integrated with turn-on, turn-off switch control and protection means with power measurement features. The collector-emitter terminals of the transistor are connected in shunt with the anode/cathode electrodes of the thyristor observing proper polarities for the devices. The transistor is employed to divert the current from the Thyristor anode-cathode path to the collector-emitter path for a time interval sufficient to permit the thyristor to recover naturally to its "off" state. This technique is effectively "forced" commutation of the thyristor while AC line and load current(s) continue to flow in alternate current paths. Additionally, control circuitry is required to provide "on"-before-"off" AC Phase Control with both turn-on ($\gamma$) and turn-off ($\delta$) control actions variable in time. The protection means accomplish electrical fault sensing and automatic reset at some controlled time interval after an electrical fault occurs. The protect means also provides a user with the capability to temporarily switch to 100% (full-on) operation of the local or branch circuit being controlled for power or measurement purposes before and after the circuit goes into reduced power. Thus comparative measurements of full power followed by reduced power are available for determining electrical demand reduction or energy savings.

The thyristor's control port, i.e., the gate-cathode diode, is first triggered, to put the thyristor anode-cathode path into the ON (conducting) state for the turn-on action ($\gamma$). It conducts until a synchronous switch turn-off action ($\delta$) is desired and effected . The thyristor and the transistor then both remain off for the rest of the AC half cycle if a voltage develops on the capacitor element associated with the synchronous switch. In steady state circuit operation the capacitor voltage development will follow any successful turn-off action of the thyristor. However, if the turn-off control action of the thyristor is unsuccessful, the thyristor will continue to conduct because the necessary capacitor voltage will not develop.

Since the capacitor plays a crucial role in concert with the thyristor and transistor, both the capacitor element and the rectifying diode bridge circuit will be considered a part of the synchronous switch hereafter referred to as the Capacitor Synchronous Switch or CSS.

When "on" before "off" AC Phase Control is desired, a turn-OFF drive consisting of a pulse of specified width is applied to the base of the shunt transistor to turn it "on". The essence of one object of the invention is to design the base drive to have sufficient current amplitude to momentarily drive the collector-base diode of the shunt transistor forward biased and thus into saturation providing the current then flowing in the anode-cathode path of the thyristor does not exceed some maximum value between the current rating of the electrical load, and that which could cause any of the switch components to exceed their safe operating area ratings. During the shunt transistor's conducting period, the actual instantaneous load current, flowing through the thyristor, will begin to divide between the thyristor and the transistor. When the transistor presents a low enough impedance path, which will occur as the it approaches saturation, the transistor will conduct substantially all of the load current away from the thyristor current path. When the thyristor's current falls below its particular holding current for a sufficiently long period, the thyristor's inner junction will recover to its forward blocking state (the PNPN recovery time). The transistor is driven "on" for a short period of time longer than the thyristor's recovery time, to affect the AC Phase Control action of turn-OFF of the thyristor component of the CSS, while the AC line and load current continues to flow without interruption. After a finite period after the thyristor recovered, the conducting transistor turns off. At that time, with both the transistor and thyristor in their non-conducting states, the load current must then perforce flow through the uncharged capacitor element of the CSS. The capacitor charges, until the load current goes through zero and reverses, and then the capacitor discharges. When the capacitor's voltage approaches zero, during its discharge cycle, the gate-cathode diode of the thyristor is again forward biased to turn the thyristor on (conducting). This overall current diversion cycle (thyristor to transistor to capacitor) then repeats itself again. The point in time that the voltage across the capacitor approaches zero will vary time depending upon the operating control level.

In an instance where the load current being conducted by the thyristor is excessive, and exceeds that which can be successfully diverted, the transistor will attempt to divert the current but the collector base diode of the transistor may not reach saturation because the base drive level, by design, is insufficient. Therefore, when the transistor cannot be driven to saturation, its C-E path impedance will not have decreased to such a degree that the current flow in the thyristor is sufficiently diverted through the transistor current path. As a consequence the thyristor does not (and cannot) recover to its OFF state since its path current never dropped below the device's holding current value. This failure of the thyristor to achieve recovery to its OFF (non-conductive) state when the transistor is driven on in any given AC half cycle, is sensed by a protect circuit as a circuit fault condition and protection circuit timing is initiated to inhibit the transistor drive turn-off phase control action for a finite time period. Therefore, the thyristor remains conducting throughout each subsequent AC half-wave during the protect function timing interval. The circuit is then automatically reset if the system fault is no longer present at the end of the protect circuit timing interval.

Thus the thyristor, with its relatively high $I^2t$ withstand capability, will always conduct any excessive load current by remaining remains ON over the entire half wave and therefore, the pulsed "on" transistor never has to conduct above a design level of current. Further, when the thyristor continues to conduct, the voltage across the transistor's collector-to-emitter (C-E) never exceeds the nominal one volt of the forward conducting thyristor. Therefore, the transistor, with its relatively low peak transient current withstand as a consequence of limited peak power dissipation capability, is protected by the thyristor from being operated outside its safe operating area curve.

BRIEF DESCRIPTION OF THE DRAWINGS

FIGS. 8a through 8g show the pertinent voltage and current waveforms actually observed at four different levels of control, i.e., 100%-on, 70%-on, 30% on, and 18% on of a typical lamp-ballast combination operated from a Power Controller based on the self protecting synchronous switch described in the preferred embodiment.

FIGS. 9a through 9c show pertinent voltage and current wave forms relating to a ballast-transformer primary winding and the fluorescent lamp(s).

DESCRIPTION OF THE PREFERRED EMBODIMENTS

Figure 1:
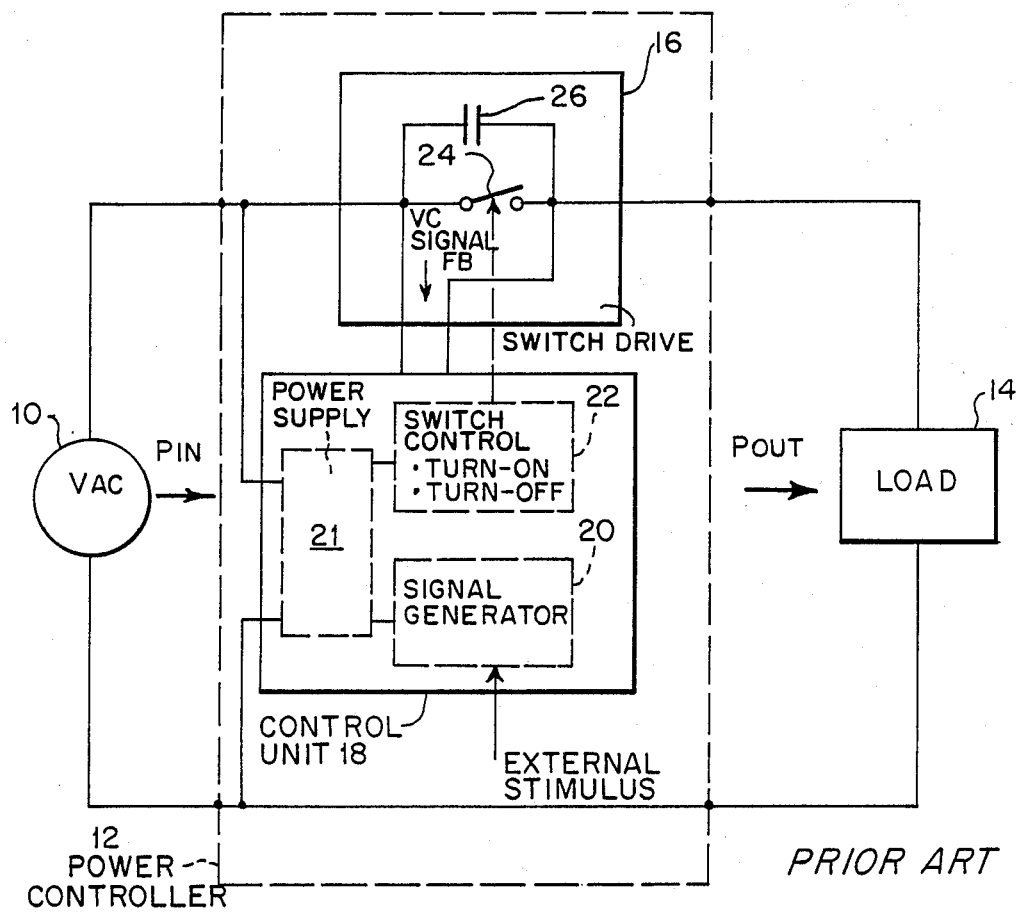
FIG. 1 is a block circuit schemtaic of a prior art generic synchronous switching technique used as a Power Controller to control the flow of AC power to an electrical load.

FIG. 1 is a block circuit schematic of a prior art methodology for the control of AC power to inductive loads by a tandem disposed Power Controller. It depicts basic elements consisting of a voltage source AC power supply 10 connected through a Power Controller 12, to an inductive load 14, representing a real power load having parasitic and/or desired magnetic energy storage effects such as a rapid start transformer ballast and associated fluorescent lamp(s). The Power Controller is composed of a series disposed synchronously operated switching device 24 shunted by capacitor 26, capable of being operated in synchronism with the carrier wave voltage that is being applied from source 10 while under the control of signal generator 20 and switch control 22 with local control power supplied by Power Supply 21. Capacitor 26, whose value is of critical importance, is connected in shunt with synchronously driven switch 24. It acts to absorb the proved voltage transient effects of the magnetic storage elements and for a more continuous current flow in the load circuit over the entire AC half wave.

The use of capacitor 26 in this manner obviously has no value for Normal AC Phase Control. A more useful operating mode might be to utilize the generic "ON"-before-"OFF" method of AC Phase Control with turn-off ($\delta$) occurring at different points in time depending on the level of control desired and with turn-on ($\gamma$) occurring at the zero crossing of the AC source 10 voltage. Obviously in the Reverse AC Phase Control operating mode the regenerative property of a thyristor switch device can not be used.

Figure 2:
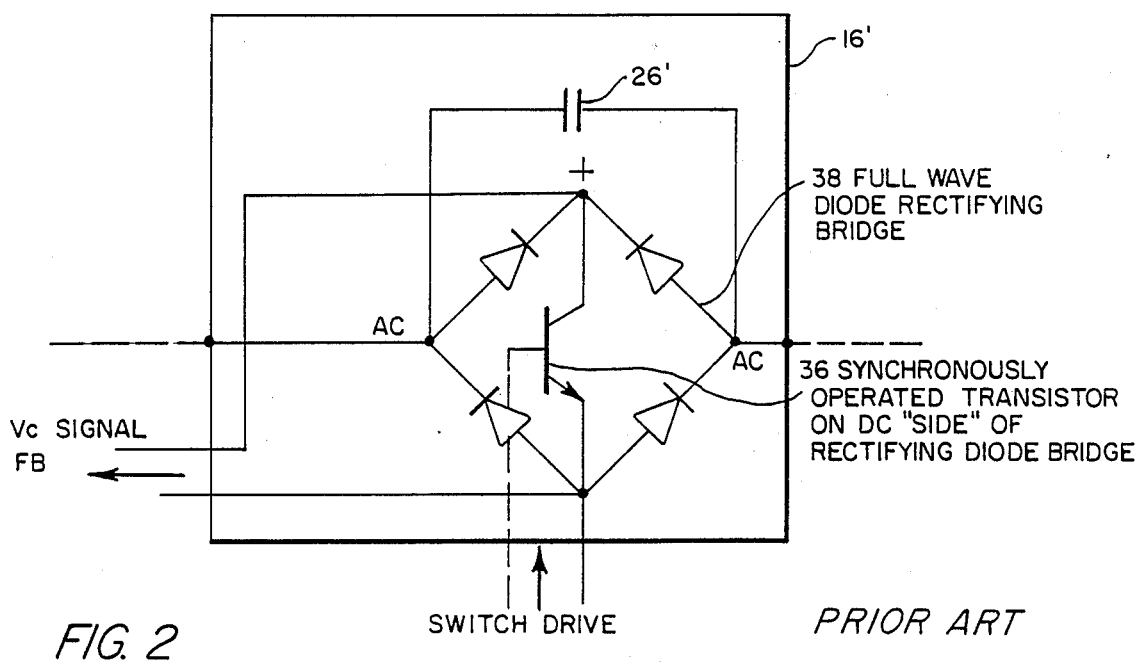
FIG. 2 is a typical prior art synchronously operated bi-directional (AC) switch implemented with a unidirectional (DC) switching device.

The implementation of bi-directional synchronous switches for circuits following the generic form of prior art FIG. 1 and operating in an "ON" before "OFF" mode of Reverse Phase Control generally use a unidirectional device(s) such as a bipolar transistor connected across the DC terminals of a rectifying diode full wave bridge as illustrated in FIG. 2. Therein transistor 36 is used as the synchronous switching device because it has the ability to be turned "on" or "off" at will by action on the drive signal applied to its base electrode. Note that U.S. Pat. Nos. 4,350,935, 4,352,045, 4,394,603, and 4,507,569 all use bipolar transistors as the principal load current switching element to effect the ON-before-OFF method of AC Phase Control. However, as explained above and in more detail in U.S. application No. 571,830, filed on Jan. 19, 1984, the timing of switch turn-on is important and care must be taken to insure that turn-ON of the transistor 36 does not occur until the stored energy in capacitor 26' is approaching zero. If the latter is not accomplished a damaging current transient can be generated when capacitor 26' is effectively "shorted" out with the capacitive stored energy substantially dissipated within the transistor being turned on. These transients can ultimately degrade or even destroy the transistor device used to implement the synchronous switch.

In addition, non-synchronous, i.e., (asynchronous) operation with possible consequent non-symmetrical half wave to half wave operation of the capacitor's Synchronous Switch device will inevitably occur if the Power Controller control circuits are sensitive to power line transients caused by other electrical loads. Asynchronous switching may inadvertently also result from power line transients generated external to the branch circuit or at initial energization or de-energization of the branch, or even locally switched circuits, or during branch circuit faults, or due to power line or load drive failures, or failure of the Power Controller control mechanisms and/or lamps and/or ballasts or any or all combinations thereof. The energization/-deenergization of a breaker or local switch circuit may also be intentional for signaling or power measurement purposes. For example, whenever a fluorescent lamp's arc remains unfired or the lamp is removed with the ballast circuit still energized, a large ferroresonant caused current transient(s) can be generated if the circuit has sufficient capacitive reactance in series with the parasitic inductive parameters of the ballast transformer. The loss of the lamp portion of the load causes a change from a high power factor load of the ballast(s) and lamp(s) to the reactive load of the unloaded ballast-transformer(s) and the capacitor and a phase reversal transient is created. When such a phase reversal transient is generated the electronic semiconductor elements of the CSS, unless protected in some manner, may be operated beyond their safe operating area(s) and voltage breakdown or junction failure of these elements can occur. If the CSS survives such a phase reversal transient the continuing undamped ferroresonance phenomena causes higher voltages to appear across the capacitor which in turn will cause excessive and repetitive current transients. Of note, when the circuit is proper the phenomena of ferroresonance can be beneficially exploited as more fully described in a co-pending U.S. patent application No. 769,829 filed Aug. 27, 1985.

The present invention, by the novel use of a thyristor and transistor shunt combination to implement the unidirectional switching device in a Power Controller with special provisions for protection, increases the high current withstand, i.e., the effective $I^2t$ characteristic of the transistor implemented synchronous switch 16 many fold, to that of the higher current withstand rating of a thyristor type device. Thus the Power Controller can be economically protected against current transients, whatever their source.

Figure 3:
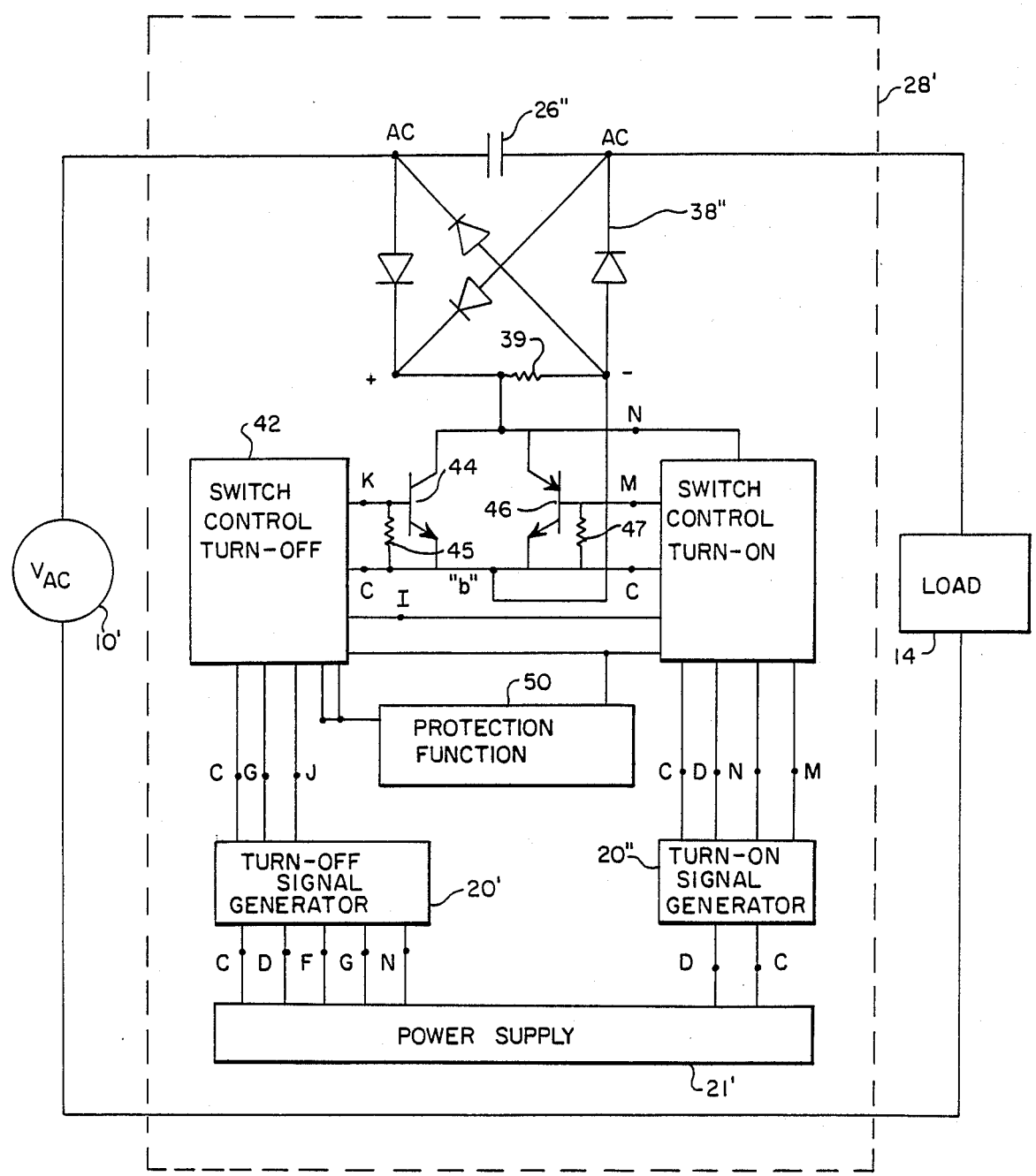
FIG. 3 is a circuit diagram of a preferred embodiment of a protected automatic resetting bi-directional synchronous switch, implemented with a thyristor using a transistor for turn-off, for use in Power Controllers similar in their conceptual nature to prior art FIG. 1.

Referring to FIG. 3, which illustrates a preferred embodiment of the present invention, two key components of this embodiment are a of this embodiment are a thyristor 46 and a transistor 44, and a key aspect of the operation of this embodiment is that transistor 44 is caused to conduct to saturation for a sufficient period of time to permit thyristor 46 to recover naturally to its off state provided the thyristor 46 current does not exceed a design threshold level which would cause the transistor 44 to pull out of saturation during the period that the transistor 44 is trying to turn thyristor 46 off. During this desired turn-off implementation period, the load current flowing through the anode-cathode path of thyristor 46 is reduced, by diverting it through the shunt transistor 44, to such an extent that any remaining current left flowing in thyristor 46 must be less than the particular characteristic holding current parameter for that device. When the anode to cathode current falls below the holding current parameter thyristor 46 recovers (in the order of tens of microseconds) to its non-conducting, or off state. The thyristor 46 them remains in the off state until its gate-cathode diode is again triggered, by the forward biasing of the gate-cathode diode, to once again regeneratively switch to a conducting or on state. A current interruption circuit for a thyristor wherein a switch is connected in shunt with the thyristor is disclosed in the GE SCR Manual, 4th Edition, page 92, copyright 1967.

The turn-off control for thyristor 46 described above is usefully extended by limiting the amplitude of the base drive to the turn-off transistor so that the transistor 44 will pull out of saturation when and if the load-circuit current is, for any reason, at some threshold above the steady state maximum peak current of the load but less than the maximum current rating of the turn-off transistor 44. When this occurs, i.e., when excessive current is flowing, the increased voltage drop across the shunt transistor 44, with its intentionally limited base drive, will be too high to effectively divert enough of the current from the conducting thyristor 46 path to lower its anode-cathode current below its characteristic holding current level. Hence, while some of the current will be diverted through the transistor 44, thyristor 46 will remain in the conducting state during and after the transistor 44 is pulsed on-off, thus protecting the shunt transistor 44 from excessive current flow at the expense of losing control of thyristor 46.

Referring again to FIG. 3, the dashed line box identified as 28' comprises an improved synchronous switch power controller which consists of the silicon bi-polar transistor 44, thyristor 46, capacitor 26", diode rectifying full wave bridge 38", plus control circuits 42, 48, signal generating circuits 20' and 20", and protection function 50. In operation, thyristor 46 is suitably biased on with a gate signal from switch control turn-on 48 working in concert with switch control turn-off protection function 50. When the gate-cathode diode of thyristor 46 is biased on substantially full power is available to the load throughout that half wave. It is obvious that thyristor 46 could be turned on with either a narrow pulse or a DC gate level signal during all or part of each AC half cycle. However, with "on"-before-"off" type control of inductive loads, the maintenance of a gate level signal, for the period of desired conduction, is preferred to insure that natural commutation to the off state does not occur with unwanted load perturbations or necessarily at the AC zero crossings.

When turn-off of thyristor 46 in FIG. 3 is desired, to obtain a desired level of reduced power operation, transistor 44 is momentarily pulsed on, by switch control/turn-off 42, at a controlled point in time in the AC half wave, when thyristor 46 is conducting. The drive pulse to transistor 44 must also inhibit any gate signal going to thyristor 46, to insure its gate-cathode diode is not forward biased when turn-off is desired and for a period of time immediately thereafter the transistor turn-off pulse occurs. The gate-cathode signal to thyristor 46 must then remain inhibited (off) until it is time for thyristor 46 to turn-on in the next half wave of conduction. If the system is operating at or below the maximum steady state current level when transistor 44 is pulsed on, thyristor 46 will recover to its off, forward blocking state. However, if the current level flowing in thyristor 46, at the time which AC phase control is commanded, exceeds the design protect level, the voltage drop across the emitter-collector of transistor 44, due to the base drive being limited by design, never falls to the saturation level where the current diverted from thyristor 46 to transistor 44 is sufficient to cause the current flowing in thyristor 46 to drop below its holding current level. In this instance thyristor 46 will continue to conduct that portion of the current which is excessive while transistor 44 conducts only the design maximum current. Thus in steady state operation where the load current flowing through the improved Capacitor Synchronous Switch 28' never exceeds a certain level, AC phase control can be accomplished and when this occurs the load current during each half wave is diverted in sequence from the thyristor 46 path to the transistor 44 path to the capacitor 26" path without interrupting the current flowing in the load 14". However, if the current flowing in thyristor 46 is in excess of the design threshold magnitude when phase control is commanded, the transistor 44 will conduct some but not all of the current and thyristor 46 which has a higher $I^2t$ rating, remains conducting. In this event, the load circuit current increases to the maximum steady state due to by the load 14 and the source voltage 10, because thyristor 46 conducted for the entire half wave. This circuit action of thyristor 46 staying in full conduction if excess current is present when AC Phase Control is commanded, constitutes a part of the protective action sought for transistor 44 and capacitor 26" as well as the four diodes comprising full wave bridge 38".

As previously discussed, when the circuit is operating with AC phase control, circuit faults can occur which can cause abnormal load currents. When such occurs thyristor 46 may not recover and/or may sporadically conduct, and current transients induce due to ferroresonance phenomena exacerbating the problem. Further, that either the abnormal current flows due to ferroresonance effects or other causes can cause excessive or non-symmetrical voltage build up across the terminals of capacitor 26" and thus the other circuit elements associated with these terminals, shown in FIG. 3, can be stressed to the point of damage. The increasing voltage due to ferroresonance effects can be observed over a period of two or more AC half waves before exceeding the voltage withstand ratings of the diodes in rectifying bridge 38" and/or transistor 44 and/or thyristor 46 which form the unidirectional switch of the preferred embodiment circuit. Since it is also unpredictable as to when a circuit fault might be corrected, e.g., a failed lamp or lamps, which may not be replaced for days, changes the load characteristics and can cause ferroresonance with its consequent voltage and current increases.

Therefore, in the preferred embodiment, the CSS is designed so if it fails to effect proper phase control action in a given half wave, that failure is sensed, and transistor 44 is inhibited from operating until the circuit fault is corrected and only then can AC Phase Control be re-instituted. When a failure to achieve desired AC Phase Control in a given AC half wave is sensed, circuit actions commence which begin a multi-cycle timing interval and during that timing interval thyristor 46' remains in full conduction while transistor 44 is inhibited from attempting AC Phase Control. This protection function is accomplished by circuitry represented by block 50 in FIG. 3. When the control circuit is in its protect mode where thyristor 46 stays in conduction, the undesirable ferroresonant effects of an abnormal load can not occur because capacitor 26" is effectively shorted out of its series relationship with inductive load 14' and thus the possibility of undamped ferroresonance is prevented. At the end of the predetermined timing interval, AC phase control action is again attempted. The protection function 50 timing interval will repeat itself if the circuit fault causing the original protect mode operation is still present by re-sensing the failure of thyristor 46 to recover once again. If the circuit fault is no longer present, thyristor 46 will recover and AC phase control action will again start its control action by slowly decreasing from full-on (180 degrees of conduction by thyristor 46) down to the desired phase angle of conduction over a period of many cycles. This slow turn down, when the circuit comes out of its full-on protection function mode of operation, is accomplished by protection function 50 working in concert with Switch Control Turn-Off 42 as explained in the descriptions of FIGS. 5 & 6. Resistor 39 serves to provide a discharge path for the capacitively stored energy in the junctions of the diodes comprising full wave bridge 38" and resistors 45 and 47 perform similar functions for thyristor 46 and transistor 44.

Figure 4:
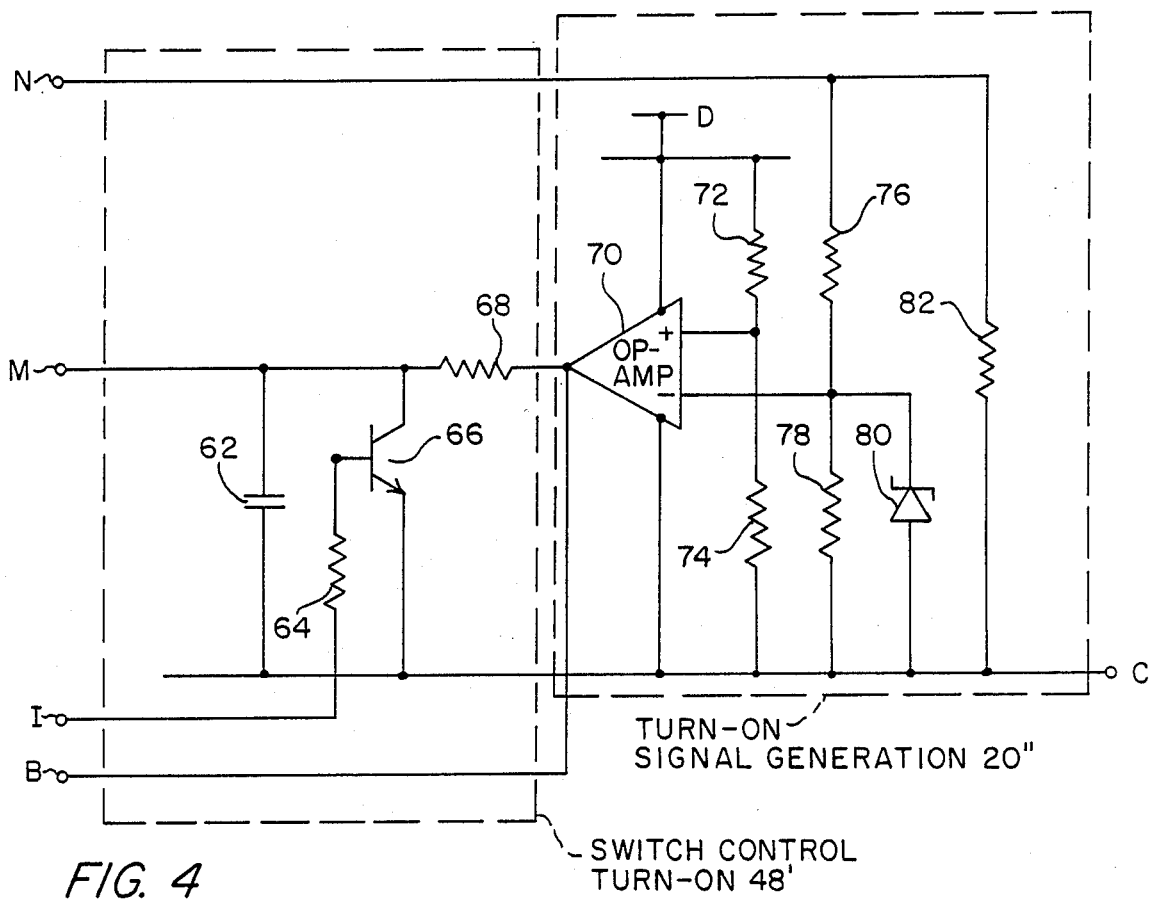
FIG. 4 is a circuit schematic diagram of the thyristor's Switch Control/Turn-On circuit and derivative prior art turn-on signal generation circuitry.
Figure 7:
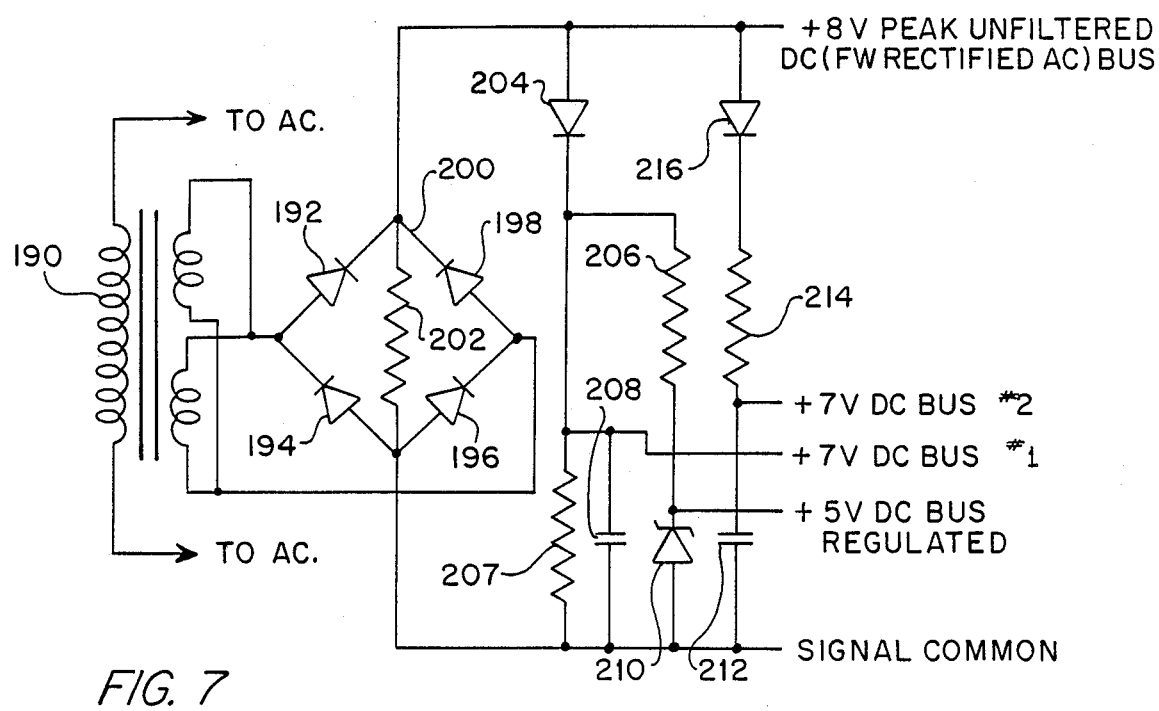
FIG. 7 is a schematic circuit diagram of the power supply operated from an AC voltage source, which supplies the various DC voltages and line synchronizing signals required for operation of the circuits shown in FIGS. 4, 5 and 6.

FIG. 4 is a circuit schematic of the Switch Control-Turn-On Circuit 48' which provides a time varying turn-on signal to the gate electrode of thyristor 46 as well as its related signal generation circuitry. The six alphabet letter designators in FIG. 4 indicate connection points to the FIG. 7 Power Supply Circuit and the Switch Control-Turn-Off Circuit 42 and Protection Function 50 whose schematic details are respectively shown in FIG. 5 and FIG. 6.

The purpose of the FIG. 4 circuit is to provide a properly timed turn-on signal to the gate-cathode diode of thyristor 46 and provide circuit fault sensing to Protection Function 50 and the Switch Control/ Turn-Off Circuit 42'. The signal generation part of the schematic consists of comparator 70 with its positive input terminal connected to the junction of a voltage divider made up of resistances 72/74 with their opposite ends connected to the power supply signal common bus C as well as the DC power supply bus D which is 7 VDC. The voltage is divided to provide a DC reference signal to the positive input of comparator 70 which is also connected to the same DC power supply. The negative input of comparator 70 is connected to resistances 76/78 and zener diode 80. The opposite end(s) of resistor 78 and zener diode 80 are connected to the signal common power supply bus C while the opposite end of resistor 76 is connected to interconnection point N. The voltage at point N is nominally one volt when thyristor 46 is conducting. Further, the voltage at point increases and declines as a function of the voltage developing across capacitor 26" when thyristor 46 is not conducting. Therefore, when thyristor 46 is conducting, the voltage divider resistances 76/78 divide the nominal one volt appearing at interconnection point N as the negative input to comparator 70. Therefore, when the positive input is more positive than the negative input the output of op-amp 70 is high, i.e., positive with respect to signal common. This output voltage signal of comparator 70 is connected through current limiting resistor 68 to the gate of thyristor 46' as its turn-on and sustaining on signal.

However, when thyristor 46' is turned-off, the consequential circuit action brought about by the path current now charging capacitor 26", causes an increase in the voltage at interconnection point N. When the voltage at point N increases, the voltage appearing at the negative input of comparator 70, must also increase until it reaches the zener voltage level established by zener 80. When the negative input voltage exceeds the fixed reference voltage appearing at the positive input, the output of comparator 70 goes low. Hence the recovered thyristor 46' will remain off until a new gate drive turn-on signal appears. Capacitor 62 serves as a filter to prevent false triggering of thyristor 46'. When resistor 64 receives a voltage signal from the switch control turn-off circuitry in FIG. 5 transistor 66 is turned-on. When transistor 66 is turned on the output of op-amp 70 is diverted from the gate of thyristor 46' directly to Signal Common bus C and thus the gate-cathode diode of thyristor 46 is back biased. Further comment on the function of transistor 66 will be made in the description of the Switch Control Turn Off FIG. 5.

Figure 5:
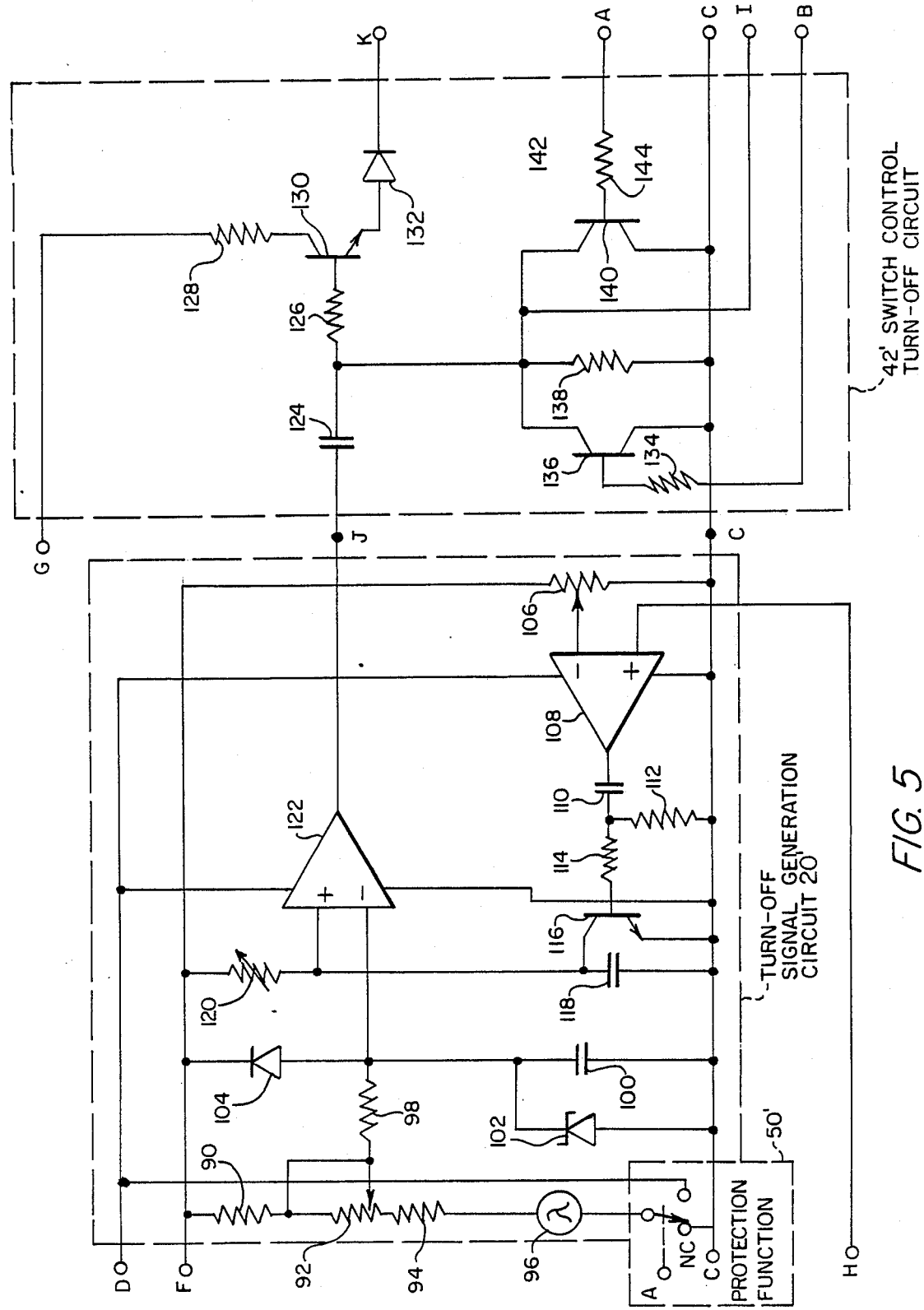
FIG. 5 is a circuit schematic diagram of the Switch Control/Turn-Off circuit and derivative prior art turn-off signal generation circuitry.

In summary, the FIG. 4 Switch Control/Turn-On circuit provides a continuous signal output, which will keep thyristor 46 conducting throughout the 180 degrees of each AC half wave, except when AC phase control is commanded by the means described in FIG. 5. The FIG. 5 circuit provides a signal to FIGS. 3 & 4 transistor 44 to effect recovery of thyristor 46, and also causes two sequential circuit actions which inhibit the FIG. 4 Switch Control/Turn-On Circuit output signal from reappearing until Capacitor 26" completes its circuit action occasioned by the successful recovery of thyristor 46. The two sequential circuit actions will be further explained in the component and operating description of FIGS. 5 and 6.

FIG. 5 is a circuit schematic of the Switch Control/Turn-Off circuit 42 shown in FIG. 3 and its related signal generation circuitry. The eleven alphabet letter designators in FIG. 5 indicate connection points to the FIG. 6 Power/Synchronism supply as well as the interconnections with the FIG. 4 Switch Control Turn-on 48' and the FIG. 6 Protection Function 50 circuits.

The purpose of the FIG. 5 circuitry is to provide a suitably timed signal to transistor 44 in FIG. 4 to initiate AC Phase Control action by causing thyristor 46 to recover to its off, non-conducting, state when the thyristor 46 element of the CSS is conducting current, providing the current flowing in thyristor 46 does not exceed a design maximum level during the time that AC Phase Control action is being commanded.

The signal generation part of the FIG. 5 schematic consists of comparator 122 operated so that its output goes high, i.e., positive, with respect to signal common, at a controlled point in time during each AC half wave. To achieve this circuit action the negative input of comparator 122 is connected to circuitry, which in steady state equilibrium operation, provides a DC reference signal level while the positive input is connected to circuitry which generates a voltage ramp nominally starting at the zero volts bus and rising to a few volts within each half wave period. Thus when the comparator's positive input ramp voltage rise above that of its negative input DC reference voltage level, the output of comparator 122 switches from low, i.e., nominally zero volts, to its high, positive voltage, and thus the output signal of comparator 122 goes from low to high at the node J. Functionally, this circuit action is accomplished starting with a voltage divider, consisting of resistor 90, potentiometer 92, resistor 96, and photo cell 96 connected in series between the 5VDC regulated power supply bus F, through the protect function 50 circuit, to the zero volt signal common bus C. Of note, the resistance or conduction of photo cell 96 varies as a function of the light level falling incident on the photo cell. The juxtaposition of photo cell 96 relative to the resistors determines either a rising or falling minus voltage signal to the input of comparator 122 level with increasing incident light on the photo cell. Examples of the latter might include a follower system where the controlled power to load 14' in FIG. 4 increases with increasing incident light on the photo cell or an energy conserving ambient daylight controlling lighting system where as daylight increases the incident light falling on the photo cell increases to cause a decrease in the controlled power to the load 14'. Of further note photo cell 96 could be omitted to provide only for manual adjustment of potentiometer 98 to change the DC reference level going to the minus input of comparator 122.

For purposes of this description, the switch function shown in the dotted block of FIG. 5 should be viewed as connected to point C and further explanation will be given in the description of the protection function 50 circuits in FIG. 6. Resistor 98 and capacitor 100 form an RC filter network to preclude a rapid change of the reference voltage signal at the minus input to comparator 122 to the extent of the charge or discharge time of capacitor 100. Thus changes in the reference voltage level at the negative input to comparator 122 can only occur over many AC cycles. This feature is particularly useful in causing a slow turn down when the yet to be described protection function 50 operates as well as the slow turn-on feature as more fully described in U.S. application 723,184 filed Apr. 15, 1985. Zener diode 102 limits the maximum voltage of the negative input to comparator 122 and diode 104 provides a rapid discharge path for the stored energy in capacitor 100 when the circuit including the power supply is turned off, i.e., diode 104 becomes forward biased when the circuit is de-energized and the power supply bus F falls to zero while capacitor 100 still has a charge.

Capacitor 118 is charged by the resistance of 120 to form a rising voltage ramp which is reset to zero once during each AC half cycle. The reset function is accomplished by a short turn-on interval of transistor 116 in synchronism with the AC line.

The pulse input to transistor 116 is achieved by the integration of a change in state of the output signal of comparator 108. Capacitor 110 is charged by resistor 114. Resistor 112 simply pulls the base electrode of transistor 116 to zero volts when the turn-on pulse is not present. The low to high change in state of comparator 108 happens by establishing a DC level signal, derived from the voltage dividing potentiometer 106 at the minus input to comparator 108 and connecting the positive input of comparator 108 to the full wave rectified AC derived from power supply bus H. Thus, whenever the increasing FW rectified AC voltage exceeds the DC reference voltage at the negative input of the comparator 108, the output changes state and transistor 116 is momentarily pulsed on to discharge capacitor 110 to virtually zero. This reset starts the next voltage ramp which is the positive input to comparator 122. The exact time that the change in state of the output of op-amp 108 occurs can be varied by the setting of the shaft angle of the wiper arm of potentiometer 106 which varies the amplitude of the DC reference voltage level. This signal generating method is more fully described in U.S. patent application 571,820 filed Jan. 19, 1984.

In the Switch Control/Turn-Off 42' section of FIG. 5 the output of comparator 122 appearing at interconnection node J, is filtered by the RC network consisting of capacitor 124 and resistor 126. In normal operation it provides a pulse signal which through transistor 130 and diode 132 drives the CSS transistor 44 shown in FIG. 3. The collector of transistor 130 is connected through a current limiting resistor 28 which is in turn connected to the power supply bus G to provide an adequate but design limited collector-emitter current to drive transistor 44 into saturation so long as the collector current of transistor 44 as determined by the external circuit conditions does not exceed some margin of current above the maximum steady state peak operating current of load 14' in FIG. 3. Diode 132 has a relatively high voltage PIV rating and serves the purpose of blocking any unwanted high voltage that appears at the base electrode of transistor 44 from reaching the Switch Control Turn Off circuitry in the event a voltage breakdown would occur in transistor 44 of FIG. 3.

Node 1 is the connection point between the junction of capacitor 124 and resistor 126 in FIG. 5 and the resistor-transistor 64-66 circuit in FIG. 4. Thus whenever the Switch Control/Turn-Off 42' pulse voltage exceeds the emitter base diode drop of transistor 66 in FIG. 4, the latter is turned on to then divert the signal output of comparator 70 in FIG. 4 from reaching the gate of thyristor 46 of FIG. 3. It should be understood that the "on" period of transistor 66 in FIG. 4 is longer in time than the "on" period of transistor 44 in FIG. 3 because transistor 44 turns-off when the trailing edge of the pulse generated by RC network capacitor 124 and resistor 126 drops below the nominal 3 volts required for maintaining conduction through the two base emitter diodes of Darlington transistor 130, diode 132 and the base emitter diode of transistor 44 in FIG. 4, while transistor 66 stays on until the turn-off pulse drops to less than one volt. During the overlap time period where transistor 66 is still "on" while transistor 44 in FIG. 3 has completed its pulse cycle and is off.

Assuming the FIG. 3 transistor 44 "turn-off" function diverted sufficient current from thyristor 46 to effect its recovery, the load current now flows through the virtually uncharged capacitor 26", shown in FIG. 3. Capacitor 26" is then rapidly charged by the instantaneous AC line voltage 10 as well as any voltage generated by any inductive energy storage within the closed circuit. Further, substantially all of the voltage appearing across capacitor 26 voltage drop appears at interconnection node N, which provides the negative input signal to comparator 70 via resistances 76/78.

Therefore as soon as capacitor 26" begins to charge, the output of op-amp 70 in FIG. 4 which was initially pulled down by the Switch Control Turn-Off pulse action of FIG. 4, causing the turn-on of transistor 66, now goes low until capacitor 26' completes its charge-discharge cycle. Once the discharge cycle of capacitor 26" is substantially completed the output of op-amp 70, in FIG. 5 will again go high and cause thyristor 46 to again turn-on and thus begins the next half wave cycle. The voltage rating of capacitor 26" and its capacitance parameter are critical in that the peak voltage due to the $\int i \, dt$ (charge) becomes relatively high. Further, the capacitance value must be sufficiently large to insure ferroresonance is induced but not let the voltage charge exceed a practical working level for a given $\int i \, dt$. Still further, capacitor 26" must have sufficient stored energy that the reversal of current through zero is rapid and results in a magnitude of reversed current flow that maintains the gas discharge in the fluorescent lamp(s) part of load 14' in FIG. 3 during the period that the CSS active switching elements are off. Empirical testing has found that a nominal four to five microfarad capacitor is required for each transformer ballast driving (2) forty watt rapid start lamps (and a 0.66 to 1 microfarad capacitor in the instance of a 277 VAC transformer ballast) to keep (2) 40 watt rapid start lamps on at a minimum stable level before AC Phase Control is commenced. Thus a multiple ballast lamp circuit requires an added amount of capacitance for each parallelled ballast-/lamp(s) combination added to a given power controller 28'.

To prevent the capacitor synchronous switch's turn-off transistor 44 from falsely responding to spurious voltage signals at its base-emitter, resistor 134 in FIG. 5 provides a signal to the base electrode of transistor 136 so as to keep transistor 136 biased off whenever the output of comparator 70 in FIG. 4 is positive. Further, transistor 136 is biased on whenever the output of comparator 70 in FIG. 4 is low. Thus when thyristor 46 is off, transistor 136 is "on" which causes transistor 130 to be back biased. Therefore, when transistor 136 is turned-on transistor 44 can not receive a false trigger signal. The signal path connection of transistor 136 through resistor 134 is made to comparator 70 in FIG. 4 via interconnection node B, which also connects to the Protection Function 50 yet to be explained. Transistor 140 and resistor 144 also serve a protect function in that when transistor 140 is turned on by a signal received from the FIG. 3 protection function 50 block through node A, transistor 130 is again backed biased and it cannot be pulsed on. Therefore, when transistor 140 is turned-on, transistor 44 in FIG. 3 is inhibited from performing its turn-off pulse function and therefore, thyristor 46 will continue to conduct.

The Turn-Off and Turn-On parts of the CSS interact as follows:

Event 1.

As the ballast-lamp combination is initially energized, current begins to flow in the series path formed by the source voltage 10', capacitor 26" and load 14' consisting of a ballast-lamp(s) combination of FIG. 3. Thyristor 46 turns-on due to the action of the Switch Control/Turn-On 48' as soon as the power supply voltage rise to a minimum operating level. The latter is designed to occur before lamp ignition.

Event 2.

Also, before the lamps have fired the RC components 98 and 100 in FIG. 5 cause the minus input reference voltage of op-amp 22 to rise over a time period greater than nominally one second, thus the Switch Control/Turn-Off pulse delivered to FIG. 3 transistor 44 virtually starts at zero degrees of phase angle and increases. Therefore, because the CSS operates on before off the conduction period of thyristor 46 during each half wave slowly increases to the circuits equilibrium level over many AC cycles.

Event 3.

If thyristor 46 turn-off is effected, and such will occur if the thyristor current is within proscribed limits at the time turn-off is being attempted, transistor 66 is turned on and the output of comparator 70 in FIG. 4 is pulled low. The latter forward biases the emitter base diode of transistor 136 in FIG. 5 and whenever the emitter of transistor 136 is positive and the output of op-amp 70 is low, thyristor 46 must be off.

Event 4.

In normal steady state operation the load current sequentially switches between three paths: (a) load current first flows in capacitor 26" and when the capacitor voltage approaches zero, thyristor 46 is permitted to turn-on and (b) the load current flowing in the capacitor 26" switches to the thyristor 46 path until transistor 44 is pulsed-on. The load current then switches from the thyristor 46 path to (c) the transistor 44 path. During the time period that transistor 44 is conducting the load 14 current, thyristor 46 recovers to its forward blocking state. Then when transistor 44 stops conducting, and thyristor 46 has recovered the load current is left to flow through capacitor 26' for the remainder of the AC half cycle. The current cycle then repeats.

Event 5.

However, If during the time period that transistor 44 is pulsed "on", to effect the turn-off of thyristor 46, and if the current flow in thyristor 46 is excessive to the point that transistor 44, with its current limited drive, is unable to approach saturation to provide a low enough impedance path to divert enough of the thyristor 46 current to cause its recovery then thyristor 46 will continue to conduct a part of the load current while transistor 44 is "on" and return to conducting all of the current after transistor 44 completes its attempted turn-off thyristor 46 operation. In this event capacitor 26" will not become the next load current path hence it will not develop the voltage charge necessary to cause a change in the output state of op-amp 70 in FIG. 4. Therefore, no change of state signal occurs in comparator 70 at node B of FIG. 5 and FIG. 6.

Event 6.

The lack of a change of state signal at the node B causes further circuit action. Protection Function 50 comes into play by inhibiting the Switch Control/Turn-Off 42' from developing an output pulse to drive transistor 44 for a finite time period. After the time out period 50 runs its course, the Switch Control/Turn-Off 42' again provides a pulse turn-off signal. If the circuit current fault, which initially caused thyristor 46 not to recover, has been corrected AC phase control is again possible. As long as current fault is still present the protection function 50 will continue to repeat its protect function timing interval.

Thus, when a current fault occurs, which could be of short or long term duration, thyristor 46 will generally be put in the conducting state through out each AC half cycle for a finite time interval if a closed circuit exists. When thyristor 46 is conducting, capacitor 26" is essentially shorted out of the circuit. Therefore, any undesirable ferroresonance phenomena, due to the capacitor 26' being in series with the parasitic inductance of load 14 when the dissipative component of the load, i.e., lamps, ameliorated. Accordingly, a ballast(s) may be energized without lamps ignited without destructive voltage or current transients being generated through ferroresonance.

Figure 6:
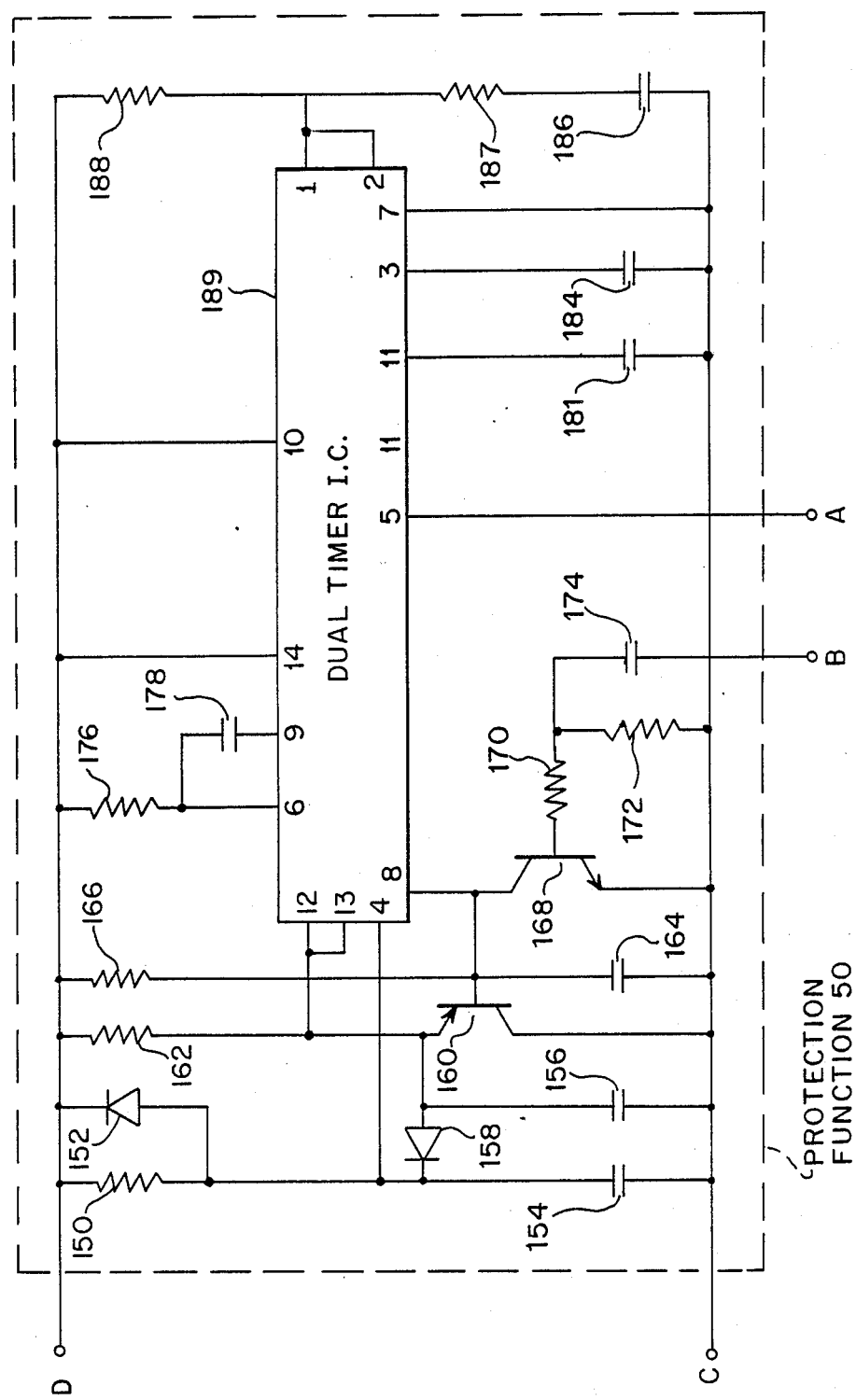
FIG. 6 is a schematic circuit diagram of the Protection function circuit including an Integrated Circuit with two timers.

FIG. 6 is a circuit schematic of the FIG. 3 protection function 50 block. It indirectly senses whenever thyristor 46 fails to recover when AC Phase Control has been attempted. This sensing is accomplished by noting that the output of comparator 70 failed to change its output within a given AC half cycle when AC Phase Control should have occurred. The failure of comparator 70 to change its state during each AC half cycle of closed circuit operation indicates that capacitor 26" didn't go through its charge-discharge cycle as a result of thyristor 46 failed to recover. When the output of comparator 70 fails to change its state in a given AC half cycle, protection block 50 in effect senses the missing half cycle circuit action and causes further action to inhibit the Switch Control/Turn-Off 42 from operating for a finite time period. When the latter happens thyristor 46 remains in the conducting state until the "protect" time interval is complete. If the fault is no longer present, automatic reset is permitted. After a period of sustained conduction by thyristor 46' operating in its protect mode, the circuit automatically attempts to reset itself by the Switch Control/Turn-Off 42' commencing to again operate. If thyristor 46 recovers, control recommences from the full conduction of the protect mode to that required, e.g., to a level requiring say 95 to 100 degrees of conduction, over a period of many AC half waves. This slow turn down is required to prohibit a rapid change between two sequential half waves that could cause an undesirable non-symmetrical current transient.

The heart of the Protection Function 50 block is a dual timer Integrated Circuit (IC) 192 such as a (Motorola MC 3456/3856) which, with suitable inputs and interconnections has the capability of generating two sequential time delays. The sequential delay times are achieved by the charge times of an external RC filter network consisting of one or more resistors and capacitors for each of the two timers. The input and interconnection circuitry is configured so the first operating timer B will trigger the second operating timer A if the first operating timer B completes its timing cycle. The RC timing network for timer B comprises resistor 162 and capacitor 156 whose junction is joined to IC threshold and control terminals 12 and 13 with the opposite ends of this network connected to the zero volt common bus C and the DC power source (node D) respectively. The external RC component values determine the time delays. In the instance of timer B the RC component values were selected to make one complete timing cycle in 12 milliseconds because that time period exceeds the time period of one AC half wave.

To complete the timing cycle of timer B, the voltage across capacitor 156, normally charged by the resistance of 162, must reach 0.66 of the DC supply voltage. When the voltage charge on capacitor 156 reaches 0.66 of the DC power supply bus D, the output terminal 9 (of timer B) goes from high, nominally the DC supply voltage level, to low, which is nominally zero volts. Terminal 9 of timer B is also connected to trigger terminal 6 of timer A and the falling wave form sensed at terminal 6 serves to trigger the start of timer A which serves to inhibit the Switch Control/Turn-Off 42' function of FIG. 6. It is important to understand that the timed interval of the second operating timer A only occurs if timer B first reaches 0.66 of the 7 VDC supply voltage which does not occur so long as comparator 70 in FIG. 5 charges its output state during each nominal 8.3 millisecond AC half cycle. Therefore in normal steady state operation timer B never completes its cycle since the voltage developed on capacitor 156 is reset to zero during each nominal 8.3 millisecond AC half wave, and thus the trigger threshold level of timer B, which takes 12 milliseconds, is never achieved. The reset to zero voltage charge on capacitor 156 happens because transistor 160 is pulsed on once during each AC half cycle providing comparator 70 experienced a change in its output state within the AC half cycle. Functionally, transistor 160 is pulsed on by transistor 168 which receives a pulse signal generated by the integration of the low to high output change of comparator 70 in FIG. 4. Capacitor 164 in FIG. 6 keeps transistor 160 biased off except when the change in state pulse from transistor 168 occurs. Terminal 8 is the trigger terminal of timer B and it is normally high. Thus timer B is re-triggered contemporaneously with the ramp voltage on capacitor 156 being discharged when transistors 160 and 168 are pulsed on. Resistor 172 and capacitor 174 form the RC network which integrates the low to high change in state output of comparator 70 in FIG. 4, to provide both the trigger and reset signals for the first operating timer B. In summary, timer B, during normal steady state operation of the load circuit, is reset to zero during each AC half cycle, hence timer B never completes its 12 millisecond cycle and therefore, the sequentially operated timer A, with its longer time interval, is not triggered. If a circuit fault occurs, and results in the timer B capacitor 156 voltage not being reset to zero within a given half cycle, then timer B completes its nominal 12 millisecond charging cycle and triggers the longer timer A timing interval. Reset terminal 10 of timer B is connected to the DC supply bus so timer B can be triggered following each cycle in which trigger terminal 8 is pulled low.

It should be noted that at initial turn-on of the load circuit many AC line cycles are required to ignite the lamps and for the turn-off pulse output of FIG. 5 to phase angle advance to the equilibrium command level. During at least the early part of this start up period the output of comparator 70 in FIG. 5 may not always reset which would or could cause timer B to complete its cycle and thus trigger the protect mode timing interval by starting timer A. Hence the FIG. 6 Protect Function 50 in normal operation should be inhibited when the load circuit is initially energized and normal operation is desired. During this initial start period the circuit is being protected from starting transient(s) by the slow "turn-on" brought about by the slowly charging RC filter formed by resistor 98 and capacitor 100 in FIG. 5. This slow turn-on protective feature is more fully described in co-pending U.S. application 723,184 filed on Apr. 15, 1986.

The inhibiting of timer B, when the load circuit is initially energized, may be accomplished by the RC filter comprised of resistor 150 and capacitor 154 associated with diode 158 in FIG. 6. Capacitor 154 has a larger capacity value than the adjacent control and threshold capacitor 156, hence when the system is initially energized, capacitor 156 at initial turn-on charges more slowly because capacitor 154 takes current from both charging resistors 150 and 162. Thus many cycles pass before the initial charge of capacitor 154 can be completed at which time resistor 162 no longer assists in the charging of capacitor 154 and only charges capacitor 156. Whenever the voltage charge, on timing threshold capacitor 156, is reset to zero each time comparator 70 has a change in output state capacitor 154 is not discharged because diode 158 is back biased. Hence a delay of one or several seconds only occurs when the load system is initially energized and thereafter capacitor 156 will attempt to charge to its trigger level in approximately 12 seconds if an AC half cycle is skipped. Accordingly, stable arc ignition occurs and equilibrium operation of the load circuit is at least being approached before the timer A protect function 50 is allowed to operate. Diode 152 provides a lower impedance path for the energy charge on capacitors 154 and 156 to discharge through when the DC power supply is de-energized. The RC filter network consisting of resistor 150 and capacitor 154, in addition to its inhibit function during the initial energization period, also provides a means for a user to be able to measure full power operation, i.e., no AC Phase Control reduced power operation, to be followed by measuring the power required for the reduced level of operation at any time. Thus the electrical demand reduction of one or more control circuits of the type described herein, deployed remotely from the power measurement point, i.e., the electrical panel, breaker or local switch, can be accurately determined as the difference between the full-on power measurement and the reduced level of operation power measurement. Further detail on this power measurement provision will be explained after the description of the function of timers A and B is completed.

In summary, the timer(s) circuit operation at turn-on is to delay the charging of capacitor 156 by diverting the charging current from resistance 162, to capacitor 154 and therefore the voltage charge across capacitor 156 does not reach the voltage level required to trigger timer A, until after stable arc ignition of the lamps is achieved and the turn-off "phase angle" pulse is advancing toward the steady state equilibrium level of conduction for thyristor 46'. During this initial turn-on time period the diode 158 prevents resistance 150 from charging capacitor 156 yet permits resistance 162 to charge capacitor 154 at the initial turn-on. Thus the time constant for timer B to trigger timer A is several seconds at first turn-on and thereafter becomes twelve milliseconds if timer A is allowed to complete its charge cycle. However, time A is not triggered so long as the timer B trigger voltage ramp is reset to zero during each 8.3 millisecond AC half wave as a result of capacitor 26" going through its steady state operational charge-discharge cycle which verifies that thyristor 46 recovered during that AC half wave. However, if for any reason thyristor 46 misses a half wave recovery, the protect function 50 circuit will not receive the pulse signal which resets the charge voltage across capacitor 156 to zero and hence, capacitor 156 will continue to charge beyond the time period of the AC half cycle. When the voltage charge on capacitor 156 reaches 0.66 of the DC supply voltage, which takes 12 milliseconds, timer A will be triggered. During timer A's longer time interval, the switch control turn-off 42 circuit is inhibited from providing the turn-off pulse to transistor 44 in FIG. 3. Therefore thyristor 46 continues to conduct and the circuit can be said to be in its protect mode of operation. A more detailed explanation of timer A follows.

When timer A is triggered its output terminal 5 goes from low (zero volts) to high (nominally that of the DC power supply bus D) for the timing interval set by the RC filter network consisting of resistors 188, 190, and capacitor 186. The output of terminal 5 is connected to node A in FIG. 5. One node A connection pulls the junction of capacitor 124 and resistor 126 minus by forward biasing transistor 140 in FIG. 5. Thus no turn-off pulse is generated by the Switch Control Turn-Off 42, circuit at node K in FIG. 5. In addition, and referring back to the dotted block shown on FIG. 5, the dotted block SPDT switch, represents the function of terminal 5. Normally terminal 5 is connected to power supply bus C but when timer A is triggered terminal 5 switches from the zero volt bus C to the Power Supply bus D and remains there until the time out interval of timer A is completed. This "switching" action causes capacitor 100 in FIG. 5 to become positively charged before reset occurs. Thus the negative input to op-amp 122 of FIG. 4 is at its maximum voltage level and when timer A has completed its timing interval, the negative input to comparator 122 moves slowly downward as capacitor 100 discharges when reset occurs. Thus the circuit, which has been operating full-on during the protect mode of operation, slowly moves down after it is reset, and thus reduces the possibility of current transients due to a rapid phase angle change. Also the reset is less noticeable when the light output of the load lamps is slowly changed.

As previously mentioned, the time interval of timer A is set by the values of the filter network comprised of capacitor 186 and resistances 188 and 190. Two charging resistances 187 and 189 were selected so that capacitor 186 can rapidly discharge its stored energy via terminals 1 and 2 of timer A when the circuit is de-energized. Capacitors 182 and 184 are small filter capacitors each connecting the respective control terminals 3 and 11 to the zero volt common bus. The reset terminal 4 of timer A is at the voltage level of the DC Power Supply after capacitor 154 is initially charged and thereafter, timer A is prepared for triggering whenever terminal 8 is pulled minus.

In summary, operation of the protection function is to sense that AC phase control is accomplished whenever commanded. If for any reason capacitor 26" fails to develop a suitable voltage, timer B will complete its 12 millisecond timing interval and cause timer A to trigger which in turn causes the Switch Control Turn-Off 42 circuit to be inhibited and thus the load circuit goes into the "full-on protect mode" wherein thyristor 46 conducts the entire AC half wave, until reset can occur. Reasons that could cause the failure of capacitor 26" to develop a suitable voltage level to attest to proper circuit operation include but are not limited to one or more AC half cycles being dropped out of the AC source voltage 10' of FIG. 3 , excessive current flow in thyristor 46 that prevents its recovery, load faults resulting in magnified voltages causing current transients due to undesirable ferroresonance effects present in the circuit and other.

FIG. 6 illustrates a prior art means for generating the necessary DC voltages from AC voltage source 10' shown in FIG. 3. It includes a step down transformer 190 coupled to a fullwave diode rectifying bridge 200. Resistor 202 provides a return current path for the energy stored in the junctions of the bridge diodes. Diode 204, resistor 207 and capacitor 208 provide a first nominal 7 volt (filtered) DC bus D while resistor 206 and zener diode 210 and capacitor 208 provide a 5 volt DC zener regulated bus F. Diode 216, resistor 214 and capacitor 212 to provide a second 7 volt DC bus G. The output terminals of the full-wave bridge provide a zero volt signal common bus C and an 8 volt peak unfiltered DC (full wave rectified AC) bus H used for the ramp timing circuit in FIG. 5.

FIGS. 8A through 8G illustrate the voltage and current waveforms observed across various circuit elements when the circuit with load 14' consisting of one 120 VAC rapid start ballast and two F40 lamps, at four different levels of operation, i.e., 100% full-on at 97 watts, 70% on and 30% on and minimumly on. Each waveform is shown in the same time relationship to the waveforms above or below for a particular level of operation. Two general observations are obvious, i.e., each level of operation in FIG. 8B shows that except at the zero cross points, the voltage is present at the primary winding of the ballast over the entire AC cycle and FIG. 8D shows that except at the zero cross points the load current in the ballast primary winding continues to flow throughout the entire AC cycle.

FIG. 8A shows the waveform of the AC voltage source 10 shown in FIG. 3 together with witness lines showing the beginning and ending of each of two full AC half cycles of the source voltage 10'. The source voltage is the same for each of the four levels of operation.

FIGS. 8B and 8C respectively show the AC voltage across the load 14 and capacitor 26" of FIG. 4 for each of the four levels of operation. Of note, the algebraic sum of the ballast and lamps as well as and capacitor 26" voltages equal the voltage waveform in FIG. 8A. FIG. 8D shows the AC flowing through load 14 which, except at the zero crosses, continues to flow during the entire AC cycle as indicated by current flowing at each of the four levels of operation that are illustrated. FIGS. 8E, 8F and 8G respectively, show the relative time periods during each AC half or full cycle that the load 14 current flows first through thyristor 46, then through transistor 44 and then through capacitor 26". Of note, at full-on 97 watts, virtually all of the load current flows through thyristor 46, at the 70% level of operation a majority of the load current still flows through thyristor 46 and at 30% operation capacitor 26" provides the path for nominally half of the load current, and at minimum-on capacitor 26" current path carries virtually all of the load current. Of important note, the turn-on of thyristor 46 is variable and timed to occur only when the voltage across capacitor 26" approaches zero, which is an operating level determination and not related to the zero cross of the AC source voltage. FIGS. 8C and 8E further illustrate this point in that thyristor 46 turn-on shown in FIG. 8E occurs before the zero cross of the AC source voltage shown in FIG. 8A in the 70%-on example and the thyristor turn-on occurs after the AC voltage zero cross in the 30%-on example.

The FIG. 8 preferred embodiment waveforms utilized a load consisting of one (120 volt) rapid start ballast and two standard F 40 watt fluorescent lamps and also utilized a nominal capacitor value of about 4 microfarads. The capacitor value drops to nominally 0.66 microfarad with a 277 volt rapid start ballast and the same two lamps. It has also been found that by increasing the value of capacitor 26" in increments bearing a relationship to the number of ballasts additional similar ballasts-lamp load combinations can be paralleled to a single power controller of the type described herein, It should be noted that if the ballasts and/or lamps have dissimilar impedances the controlled current through the CSS will not divide evenly through the parallelled ballast primaries. When the controlled current does not divide evenly between ballasts in a multiple ballast system, lamp arc extinguishment may occur in some of the lamps at the lower level(s) of operation.

FIGS. 9A through 9C show additional pertinent wave forms of the ballast-lamp load at the 18% operating level shown in the FIG. 8 series. FIG. 9A is repeated to show the AC source voltage in time relationship to the current waveforms shown in FIGS. 9B and 9C. FIG. 9B further repeats the waveform of the current flowing in the ballast primary winding when operating at the 18% level, i.e. all load current flowing in the capacitor 26" path, as well as the electrical arc current within the two fluorescent lamps to indicate stable arc ignition occurred. Further, 9B includes a 1000 times scale expansion of the lamp arc current to show that the arc current is continuous except where it crosses through zero. FIG. 9C illustrates measurement observations at the same points where the 9B observations were taken but with the value of capacitor 26" reduced to 3 MFD. Note that the lamps failed to ignite as a result of inadequate ferroresonance and thus the primary winding ballast current is slightly reduced. To cause lamp ignition with this 3 MFD value, or smaller values capacitor 26", requires AC Phase Control operation of the CSS to increase the voltage applied to the ballast-lamp load.

As was previously mentioned protection function 50 provides a simple means to measure 100% full-on power (i.e. full-on without AC Phase Control) before or after the measurement of the reduced power operation of one or more of control units of the type described in the preferred embodiment. While the electrical demand of a given circuit with one or more electrical loads can be measured at the electrical distribution panel or local switch with a suitable meter the question is inevitably raised how much electrical demand would be present if the control units were operating either full-on or not even installed. While this seems simple, it isn't, because it is difficult to determine the number of light fixtures, and their level of electric demand on the particular branch or circuit and it is not practical to bypass each control to get a maximum power level of measurement. Therefore the ability to obtain periodic measurements of full-on electrical demand to compare to the electrical demand when control goes into effect is useful if an accurate level of savings is a requirement. A simple subtraction of the controlled reduced power measurement from the full-on power measurement readily available with this preferred embodiment gives an accurate reading of reduced electrical demand on an electrical branch or circuit as a result of the controls going into reduced power operation.

The turn-on RC network in the protection function block 50 offers this measurement capability in a simple fashion. A watt meter can be installed to monitor the electrical demand through a switch, breaker or other disconnect device. Once this is accomplished after the CSS is turned-on and equilibrium is reached, the meter will reflect the electrical demand of the reduced power operation. Full power operation, i.e., the electrical demand of the circuit without control reduction, can now be measured by turning the switch, breaker, or electrical disconnect off and immediately back on. During this off-on sequence capacitor 154 will fail to discharge sufficiently to perform its initial turn-on delay function. Accordingly, at the re-turn-on timer B, not having the delayed start-up available to it, will run out its 12 milliseconds before the lamps re-ignite. Hence timer A will be triggered on so full-on operation occurs for the period of the timing interval of the sequential timer A. After the timer A interval is completed the circuit(s) resets to the commanded reduced control level. Thus the two measurements are easily obtained, i.e., full-on power without control and when reset occurs the controlled reduced power level can be observed and/or recorded. Then by simply subtracting the reduced power measurement of the electrical demand from the full-on power level of electrical demand, the electrical demand savings are obtained. The measured observations may be recorded with a periodic off-on follow-up measurement to obtain the full-power and reduced power measurements over time to provide means for determining kWh consumption or savings. A further useful measurement might be obtained by placing the watt meter current probe on the feeder line(s) to a distribution panel and turning each breaker lighting circuit off-on in a timed sequence within the timer A timing interval. In this manner all circuits will all be full-on for the full-on power measurement recording followed by each one sequencing down until all are operating at their reduced power level. With a properly timed interval between the off-on switching of the breakers, a stair case recording of the electrical demand reduction of each breaker lighting circuit can be observed.

The following is a listing of the components and related values used in the circuit described under the preferred embodiment.

FIG. 3 Components

10' power source 120 VAC 60 Hertz
14' advance ballast transformer # and (2) F40 40 watt Fluorescent lamps
26" capacitor, 4 mfd 250 AC 250 AC
38" diode rectifying full wave bridge 5A 1200 PIV
39 resistor 68 K ohm, 2 watt
44 selected NPN transistor MJE 13007

45 resistor 1 K ohm, ½ watt
46 thyristor V500R-50
47 resistor 1 K ohm, ½ watt

FIG. 4 Components 62 capacitor 0.1 mfd 25 volt
64 resistor 1 K ohm, ½ watt
66 NPN transistor 2N3904
68 resistor 330 ohm
70 ¼ of Quad operational amplifier LM2902
72 220 K ohm, ½ watt resistor
74 100 K ohm, ½ watt
76 390 K ohm, ½ watt
78 47 K ohm, ½ watt (selected value)
80 zener diode IN 754

FIG. 8 Components 90 resistor 220 K ohm, ½
92 potentiometer 500 K ohm, ½
94 resistor, 47 K ohm, ½ watt
96 photo cell CL7P5HL
98 resistor, 2.2 M ohm, ½ watt
100 capacitor, 2.2 M, 50 volt
102 zener diode IN 4733A
104 diode IN4001
106 potentiometer, 250 K ohm
108 ¼ of quad operational amplifier LM2902
110 capacitor, 0.47 mfd, 35 volt
112 resistor, 1 K ohm, ½ watt
114 resistor, 1 K ohm, ½ watt
116 transistor, 2N3904 NPN
118 capacitor, 0.1 mfd, 25 volt
120 potentiometer, 250 K ohm
122 ¼ of quad operational amplifier LM2902
124 capacitor, 0.47 mfd, 35 volt
126 resistor, 670 ohm, ½ watt
128 resistor, 6.8 ohm, ½ watt (selected value)
130 transistor, 2N 3904 NPN
132 diode, IN4007
134 resistor, 1 K ohm, ½ watt
136 transistor, 2N 3906
138 resistor, 1 K ohm, ½ watt
140 transistor, 2N 3904 NPN
144 resistor 1 K ohm, ½ watt

FIG. 6 Components 150 resistor 67 K ohm, ½ watt
152 diode IN 4001
154 capacitor 47 mfd, 16 volts
156 capacitor 0.1 mfd, 25 volts
158 diode IN4001
160 transistor 2N 3906 PNP
162 resistor 100 K ohms, ½ watts (selected value)
164 capacitor 0.1 mfd, 25 volts
166 resistor 27 K ohms, ½ watt
168 transistor 2N 3904 NPN
170 resistor 1 K ohms, ½ watt
172 resistor 1 K ohms, ½ watt
174 capacitor 0.1 mfd, 25 volts
176 resistor 27 K ohms, ½ watt
178 capacitor 0.1 mfd, 25 volts
182 capacitor 0.1 mfd, 25 volts
184 capacitor 0.1 mfd, 25 volts
186 capacitor 47 mfd, 16 volts
187 resistor 100 ohms, ½ watts
188 resistor 2.2 M ohms, ½ watts (selected value)
189 Integrated Circuit Dual Timer MC 3456L Although the invention has been described relative to an exemplary embodiment thereof, it will be understood by those skilled in the art that variations and modifications can be effected in these embodiments without departing from the scope and spirit of the invention.

We claim:

1. An electrical control system for controlling the average electrical power applied to at least one electrical load device, said system comprising a DC power supply, electronic switching means connected between an alternating current source and said load device and comprising a first electronic switch comprising thyristor and second electronic switch connected in shunt with said first electronic switch and comprising a transistor, a capacitor connected to said alternating current voltage source and to said load device, and a control means, connected to the DC power supply and to said switching means, for reducing the level of average electrical power applied to the electrical load device via plurality of electrical current pathways provided by the first and second switching means, and dependent upon the switch states of the first and second electronic switches, for sequentially controlling the states of said electronic switches as follows during each AC half cycle of steady state operation:

(a) at the time of initial energization both switches are in the first, open state thereof, a predetermined level of electrical current flows through the electrical load in the closed circuit formed by a series circuit comprising said capacitor, said AC voltage source, and said load device;

(b) when said system is energized and the DC power supply reaches a system operating level, and when the electric energy stored in said capacitor has declined to a level which does not cause any harmful effect when the first switch changes from the first, open state to the second, closed state thereof, to provide a further current path including the first switch, the AC voltage source, and the load device;

(c) at a point in time within an AC half wave of system operation, the second switch changes from the first, open state thereof to the second, closed state thereof at which time the electrical current flowing in the voltage source and electrical load will momentarily divide between the two current paths formed by the first and second switches both being in the second, closed states thereof;

(d) while the second switch is in the second, closed state for the predetermined period of time within a half wave cycle of controlled operation, the first switch changes from the second, closed state thereof back to the first, open state thereof at which time the load current flows in the current path formed by the second switch in the second, closed state thereof, the AC supply, and the load device, the second switch then returning to the first open, state thereof at the end of the predetermined time period in which said second switch is in the second, closed state thereof so that with the first and second switch both in the first, open states thereof within the AC half cycle of operation, the electrical current continues to flow by reverting to an alternate current path formed by the capacitor, the voltage source, and the electrical load device, and the load current continues to flow through the alternate current path until the electrical energy stored in the capacitor declines to a level which will not cause any harmful effect in the first switch changes from the first, open state to the second, closed state thereof, at which time the foregoing switching sequence repeats itself again in the next half cycle of operation.

2. A system as claimed in claim 1 wherein said control means includes inhibit means for keeping said second switch from changing from the first, open state thereof to the second, closed state thereof useless said first switch is in the second closed state.

3. A system as claimed in claim 1 wherein said control means further comprises inhibit means for insuring that said first switch cannot change from the second, closed state thereof to the first, open state thereof if the electrical current then flowing through said first switch exceeds a predetermined maximum.

4. A system as claimed in claim 1 wherein said control means includes inhibit means for insuring that said first switch cannot change from the first, open state thereof to the second, closed state thereof until the electric energy stored within the capacitor has declined to a level which will not cause any harmful effect if the first switch changes from the first, open state to the second, closed state thereof.

5. A system as claimed in claim 1 wherein said control means includes inhibit means for keeping said first switch in the second, closed state thereof for a predetermined period of time beyond a half cycle of operation by providing a manually induced momentary power interruption which causes the second switch to fall to change from the first, open state to the second, closed state to provide a preset period of time in which the second operates with maximum average power being applied to the load device.

6. A system as claimed in claim 1 wherein the electrical load comprises at least one fluorescent lamp and at least one iron core and coil fluorescent lamp transformer ballast.

7. A system as claimed in claim 1 wherein the first switch comprises an electronic switch which is capable of handling in-rush and/or transient currents of ten times the maximum current rating of the load device, for a time duration of at least one half cycle of the AC source voltage, without causing damage to the first electronic switch; and wherein the second switch is operated in a current limited manner so that no more than a designed level of load current is allowed to flow through said second switch.

8. A system as claimed in claim 1 wherein the first switch comprises an electronic switch which is self-latching until the current flowing through said switch falls below a required holding current level.

9. A power controller for controlling the average power supply from an AC voltage source to an electrical load, said power controller comprising: switching means, connected between the AC voltage source and the load, for, in a first state, permitting current flow therethrough from the AC voltage source to the load and for, when in a second state thereof, preventing current flow therethrough from the AC voltage source to the load; capacitor means for providing a path for current flow from the voltage source to the load when said switching means is in the second state thereof; and control means for selectively varying the time at which said switching means switches between said first and second states, said switching means comprising a transistor and a thyristor connected in parallel.

10. A power controller as claimed in claim 9 wherein said control means comprises control circuitry for causing said transistor to conduct to saturation for a sufficient period to permit said thyristor to recover to the non-conducting state thereof when the current through said thyristor is less than the level which would cause said transistor to pull out of saturation.

11. A power controller as claimed in claim 9 further comprising protective control means for sensing the failure of the thyristor to recover to the non-conducting state thereof and for, in response thereto, inhibiting operation of said transistor for a predetermined period so that said thyristor remains in the conducting state thereof during said predetermined period.

12. An AC power controller for controlling the average power delivered from an AC voltage source power supply to an inductive load, said power supply comprising synchronous switching means connected between said power supply and said load and a capacitor connected in shunt across said synchronous switching means, said synchronous switching means comprising first and second unidirectional semiconductor switching devices connected in shunt between the DC terminals of a full wave rectifying diode bridge, said capacitor being connected across AC terminals of said bridge and said first and second unidirectional switching devices respectively comprising a non-regeneratively operated transistor and a regeneratively operated thyristor, said synchronous switching means further comprising control means for controlling switching of said transistor and said thyristor.

13. A power controller as claimed in claim 12 wherein said control means comprises a control circuit for causing said thyristor to switch to the conducting state thereof when the voltage across said capacitor approaches zero volts.

14. A power controller as claimed in claim 12 wherein said control means comprises control circuitry for causing said thyristor to conduct in advance of the time at which said transistor conducts in a given half wave of said AC voltage power supply so that when said transistor conducts, load current is diverted from the thyristor to cause the thyristor to return to the non-conducting state before the transistor returns to the non-conducting state thereof.

15. A power controller as claimed in claim 14 further comprising protective control means for sensing failure of said thyristor to return to the non-conducting state thereof and for, responsive thereof, inhibiting operation of said transistor for a predetermined time-out period so that said thyristor remains in the conducting state thereof for the entire AC half wave cycle and for the number of further AC half wave cycles thereafter which occur during said time-out period.

* * * * *